United States Patent
Josse et al.

(10) Patent No.: US 9,181,120 B2
(45) Date of Patent: Nov. 10, 2015

(54) TREATMENT OF MUNICIPAL WASTEWATER WITH ANAEROBIC DIGESTION

(75) Inventors: Juan Carlos Josse, Mission Viejo, CA (US); Andrew Benedek, Rancho Santa Fe, CA (US); Diana Mourato-Benedek, Rancho Santa Fe, CA (US)

(73) Assignee: ANAERGIA INC., Burlington (CA)

( * ) Notice: Subject to any disclaimer, the term of this patent is extended or adjusted under 35 U.S.C. 154(b) by 298 days.

(21) Appl. No.: 13/814,964

(22) PCT Filed: Aug. 12, 2011

(86) PCT No.: PCT/CA2011/050498
§ 371 (c)(1),
(2), (4) Date: Apr. 25, 2013

(87) PCT Pub. No.: WO2012/019310
PCT Pub. Date: Feb. 16, 2012

(65) Prior Publication Data
US 2013/0213883 A1    Aug. 22, 2013

Related U.S. Application Data

(60) Provisional application No. 61/373,549, filed on Aug. 13, 2010, provisional application No. 61/439,068, filed on Feb. 3, 2011, provisional application No. 61/452,956, filed on Mar. 15, 2011.

(51) Int. Cl.
*C02F 3/28* (2006.01)
*C02F 11/04* (2006.01)
(Continued)

(52) U.S. Cl.
CPC ... *C02F 9/00* (2013.01); *C02F 1/28* (2013.01); *C02F 1/52* (2013.01); *C02F 3/006* (2013.01);
(Continued)

(58) Field of Classification Search
CPC ............ C02F 9/00; C02F 1/28; C02F 1/52; C02F 3/006; C02F 3/1268; C02F 3/1273; C02F 3/208; C02F 3/2826; C02F 3/2833; C02F 3/2846; C02F 3/286; C02F 3/2873; C02F 3/308; C02F 11/04; C02F 2209/08; C02F 2209/10; C02F 2209/225; C02F 2303/02; C02F 2303/20; C02F 2303/24; Y02E 50/343
USPC .......... 210/603, 605, 609, 623, 630, 631, 903
See application file for complete search history.

(56) References Cited

U.S. PATENT DOCUMENTS
3,220,945 A    11/1965 Torpey
(Continued)

FOREIGN PATENT DOCUMENTS
DE    4326603 A1    2/1995
DE    102006034984 A1    1/2008
WO    2012019310 A1    2/2012

OTHER PUBLICATIONS
Parravicini, V., et al., "Aeration of anaerobically digested sewage sludge for COD and Nitrigen removal: optimization at large-scale", Water Science and Technology, 2008, pp. 691-698.
(Continued)

*Primary Examiner* — Fred Prince
(74) *Attorney, Agent, or Firm* — Scott Pundsack; Borden Ladner Gervais LLP

(57) ABSTRACT

Low strength wastewater such as municipal sewage is treated using an anaerobic digester. In some examples, a wastewater stream is separated into a solids rich portion and a solids lean portion. The solids lean portion is treated, for example to remove nitrogen. The solids rich portion is treated in an anaerobic digester, preferably with influent or recuperative thickening. In another example, the wastewater stream is fed to an anaerobic digester and solid-liquid separation stages downstream of the digester return active bacteria and undigested organics to the digester. Both cases may use a process train comprising treatment in an anoxic tank followed by a nitritation tank with a portion of the effluent from the nitritation tank recirculated to the anoxic tank to provide nitritation and denitritation.

9 Claims, 10 Drawing Sheets

(51) Int. Cl.
*C02F 9/00* (2006.01)
*C02F 1/28* (2006.01)
*C02F 1/52* (2006.01)
*C02F 3/00* (2006.01)
*C02F 3/12* (2006.01)
*C02F 3/20* (2006.01)
*C02F 3/30* (2006.01)

(52) U.S. Cl.
CPC ............. *C02F 3/1268* (2013.01); *C02F 3/1273* (2013.01); *C02F 3/208* (2013.01); *C02F 3/286* (2013.01); *C02F 3/2826* (2013.01); *C02F 3/2833* (2013.01); *C02F 3/2846* (2013.01); *C02F 3/2873* (2013.01); *C02F 3/308* (2013.01); *C02F 11/04* (2013.01); *C02F 2209/08* (2013.01); *C02F 2209/10* (2013.01); *C02F 2209/225* (2013.01); *C02F 2303/02* (2013.01); *C02F 2303/20* (2013.01); *C02F 2303/24* (2013.01); *Y02E 50/343* (2013.01); *Y02W 10/12* (2015.05); *Y02W 10/15* (2015.05); *Y02W 10/23* (2015.05)

(56) References Cited

U.S. PATENT DOCUMENTS

| | | | |
|---|---|---|---|
| 3,248,323 A * | 4/1966 | Albertson | 210/609 |
| 4,042,493 A * | 8/1977 | Matsch et al. | 210/625 |
| 4,981,593 A * | 1/1991 | Priestley et al. | 210/613 |
| 5,733,455 A | 3/1998 | Molof et al. | |
| 6,015,496 A | 1/2000 | Khudenko | |
| 8,012,352 B1 * | 9/2011 | Giraldo et al. | 210/605 |
| 2002/0192809 A1 * | 12/2002 | Lanting et al. | 435/290.1 |
| 2003/0111411 A1 | 6/2003 | Lorenz | |
| 2005/0016919 A1 * | 1/2005 | Hagino et al. | 210/613 |
| 2005/0194310 A1 * | 9/2005 | Yamamoto et al. | 210/605 |
| 2006/0249449 A1 * | 11/2006 | Nakhla et al. | 210/605 |
| 2006/0272198 A1 * | 12/2006 | Yoon et al. | 43/87 |
| 2009/0050552 A1 | 2/2009 | Novak et al. | |
| 2009/0218280 A1 * | 9/2009 | Josse | 210/605 |
| 2009/0301963 A1 * | 12/2009 | Brockmann et al. | 210/601 |
| 2011/0203992 A1 * | 8/2011 | Liu et al. | 210/607 |

OTHER PUBLICATIONS

An, Y., et al., "The integration of methanogenesis with shortcut nitrification and denitrification in a combined Uasb with MBR", Bioresource Technology, 2008, pp. 3714-3720, vol. 99.

International Search Report of PCT/US2013/027403, mailed Jan. 10, 2013.

Xing, C.-H., et al, "Micofiltration-membrane-coupled bioreactor for urban wastewater reclamation", Desalination, 2001, vol. 141, pp. 63-73.

* cited by examiner

TREATMENT OF MUNICIPAL WASTEWATER WITH ANAEROBIC DIGESTION

CROSS REFERENCE TO RELATED APPLICATIONS

This application is a national phase entry of PCT/CA2011/050498, filed on Aug. 12, 2011, which claims the benefit of priority from of copendinq U.S. provisional application No. 61/373,549 filed on Aug. 13, 2010, U.S. provisional application No. 61/439,068 filed on Feb. 3, 2011 and U.S. provisional application No. 61/452,956 filed on Mar. 15, 2011.

FIELD

Background

A biogas may be produced through the anaerobic digestion of a material containing biomass. The biogas is typically comprised of 50-75% methane and 25-50% carbon dioxide. Other gases, such as nitrogen, hydrogen, hydrogen sulfide or oxygen may be also present but collectively are unlikely to account for more than 10% of the biogas. Of these other gases, nitrogen is likely to be the largest component. The biogas can be burned directly with oxygen, for example, and so is usable as a fuel. The methane within the biogas can also be concentrated to provide a replacement for natural gas.

Biogas can be produced in an anaerobic digester. The digestion process involves microorganisms, primarily bacteria, which break down or convert the input materials to produce the biogas and an effluent. The process involves a series of bacteria types and processes, primarily hydrolysis, acidogenesis, acetogenesis and methanogenesis.

The composition of the feedstock is important to the biogas generation process. Anaerobic digesters were originally designed primarily for use with cattle manure and sludges. Other feedstock may have a different composition of biodegradable material. In general, simple carbohydrates are easiest to digest whereas large molecules are more difficult to digest. The carbon to nitrogen ratio of the feedstock is also relevant, with a C:N ratio of 20-30:1 being preferred. The moisture content or solids concentration may also vary between feedstocks.

Municipal wastewater, or sewage, is typically treated using an activated sludge process with primary clarification, a biological process train, and secondary clarification. The biological process train may provide oxidation, nitrification and denitrification by way of an anoxic-aerobic-anoxic reactor train. If low nitrate and total nitrogen concentrations are required in the effluent, methanol or another external carbon source is added to the first anoxic reactor, and possibly also to a second anoxic reactor, to enable stable and more complete denitrification. Waste activated sludge, optionally thickened, and primary sludge may be fed to an anaerobic digester at a dry solids (DS) concentration of up to about 4%.

Recently, there has been some research regarding the possibility of treating low strength wastewater (<1000 mg COD/L) by feeding essentially all of the wastewater directly to an anaerobic digester. Low strength wastewaters include, for example, ordinary municipal wastewater or sewage. The primary driver for this research is that, relative to conventional activated sludge treatment, anaerobic treatment offers the possibility of reduced sludge generation, an energy savings resulting from avoiding aerating the mixed liquor, and energy recovery from the biogas. However, in addition to the low chemical oxygen demand (COD) concentration, more than half of the COD in municipal wastewater is in the form of suspended solids, and the water is often cool, perhaps around 10 to 25 degrees C. These factors slow down the kinetics of anaerobic bacteria and the hydrolysis rate of particulate matter, and tends to take key process parameters (such as SRT, organic loading rate and food to micro-organism ratio) outside of the conditions present in working mesophilic digesters or industrial wastewater digesters. Further, the effluent from anaerobic digesters does not typically meet secondary treatment effluent quality standards for solids, nitrogen or phosphorous.

Introduction

This section is intended to introduce the reader to the more detailed disclosure that follows, and not to limit or define any claimed or disclosed invention. One or more inventions may reside in a combination or sub-combination of one or more apparatus elements or process steps described in this document.

Several processes and apparatus will be described in this specification for treating wastewater. Although other wastewaters may be treated, the process and apparatus are particularly adapted to treating low strength wastewater, for example municipal wastewater (alternatively called sewage) with less than 1000 mg COD/L. The wastewater may have a temperature, at least seasonally, of 20 degrees C. or less.

In some of the processes and apparatus, a wastewater stream is separated into a solids rich portion and a solids lean portion by way of a solids separation step. The separation step preferably removes at least some colloidal biological oxygen demand (BOD) such that the solids rich portion contains 50% or more of the BOD and 70% or more of the total suspended solids (TSS) from the wastewater. The solids rich portion is treated in an anaerobic digester preferably with thickening of one or more influent streams to the digester or recuperative thickening. The solids lean portion is treated, for example to remove soluble BOD or nitrogen. For example, the solids lean portion may be treated by way of nitritation and de-nitritation when nitrogen removal is required. Without intending to limit any claimed invention to any particular theory of operation or operation, by diverting solids, even colloidal solids, to an anaerobic digester and treating the remaining truly soluble (and easily digestible) BOD or nitrate in an energy efficient biological reactor, wastewater may be treated using less energy than an activated sludge process producing similar quality effluent, while increasing the production of biogas.

In some of the processes and apparatus, nitrogen is removed from a process stream within a wastewater treatment plant by way of nitritation and de-nitritation. The process stream is treated in an anoxic tank, effluent from the anoxic tank is treated in a nitritation tank, and a portion of the effluent from the nitritation tank is recirculated back to the anoxic tank. The feed to the anoxic tank may comprise effluent from an anaerobic digester, the digester having treated a portion of a feed wastewater, and a solids depleted portion of the wastewater. An air scrubbed (or scoured) membrane filtration unit may follow the nitritation tank. The amount of oxygen transferred to the mixed liquor by the scrubbing air may be used to assist in nitrogen removal. Optionally plant effluent may be ozonated to oxidize any residual nitrite to nitrate.

In other processes and apparatus, process streams are treated by annamox bacteria, or by a high rate moving bed bioreactor (MBBR) when nitrogen removal is not required.

In another process and apparatus, wastewater flows generally directly to an anaerobic digester. The performance of this process is may be improve by one or more of recuperative thickening, integration with an air scrubbed membrane unit, and treatment of a process stream involving nitritation and denitritation.

DRAWINGS

DESCRIPTION OF VARIOUS EMBODIMENTS

Figure 6:
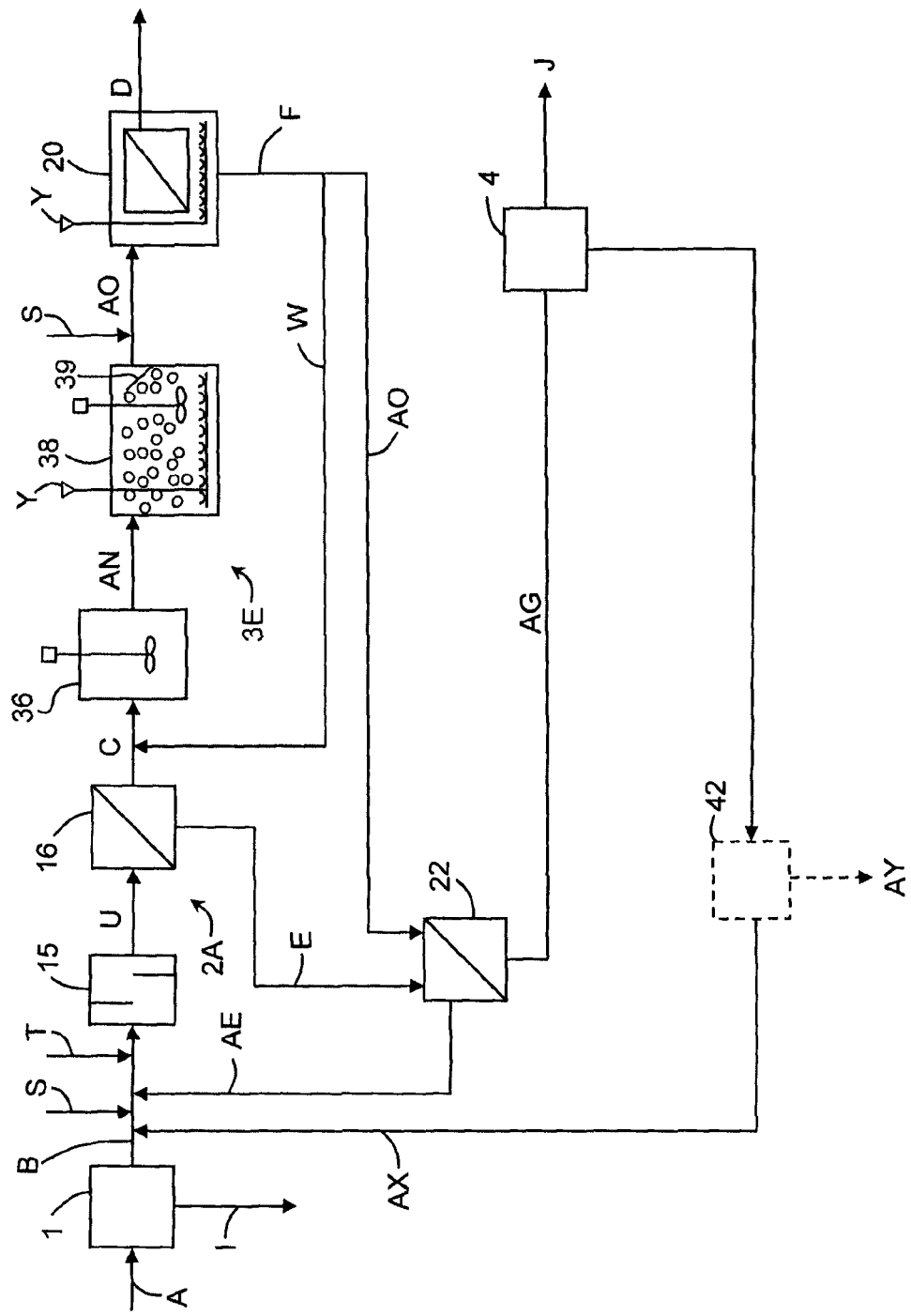
FIG. 6 is a schematic flow sheet of another treatment plant generally similar to the overview of FIG. 1 using an IFAS reactor with annamox bacteria and a submerged membrane reactor for final solids separation.
Figure 7:
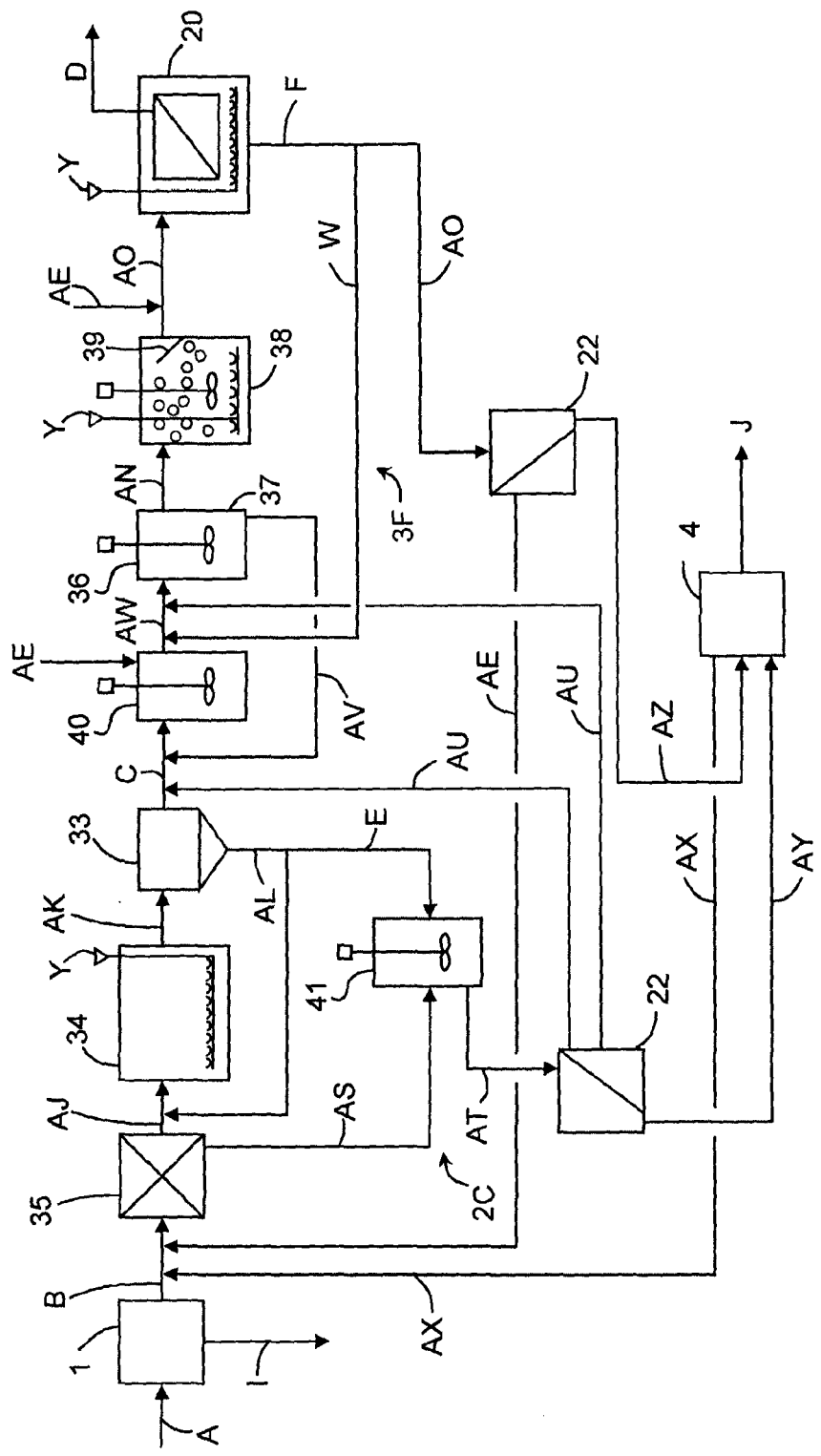
FIG. 7 is a schematic flow sheet of another treatment plant generally similar to the overview of FIG. 1 using an IFAS reactor with annamox bacteria and a submerged membrane reactor for final solids separation and including an anaerobic zone for biological phosphorous removal.
Figure 8:
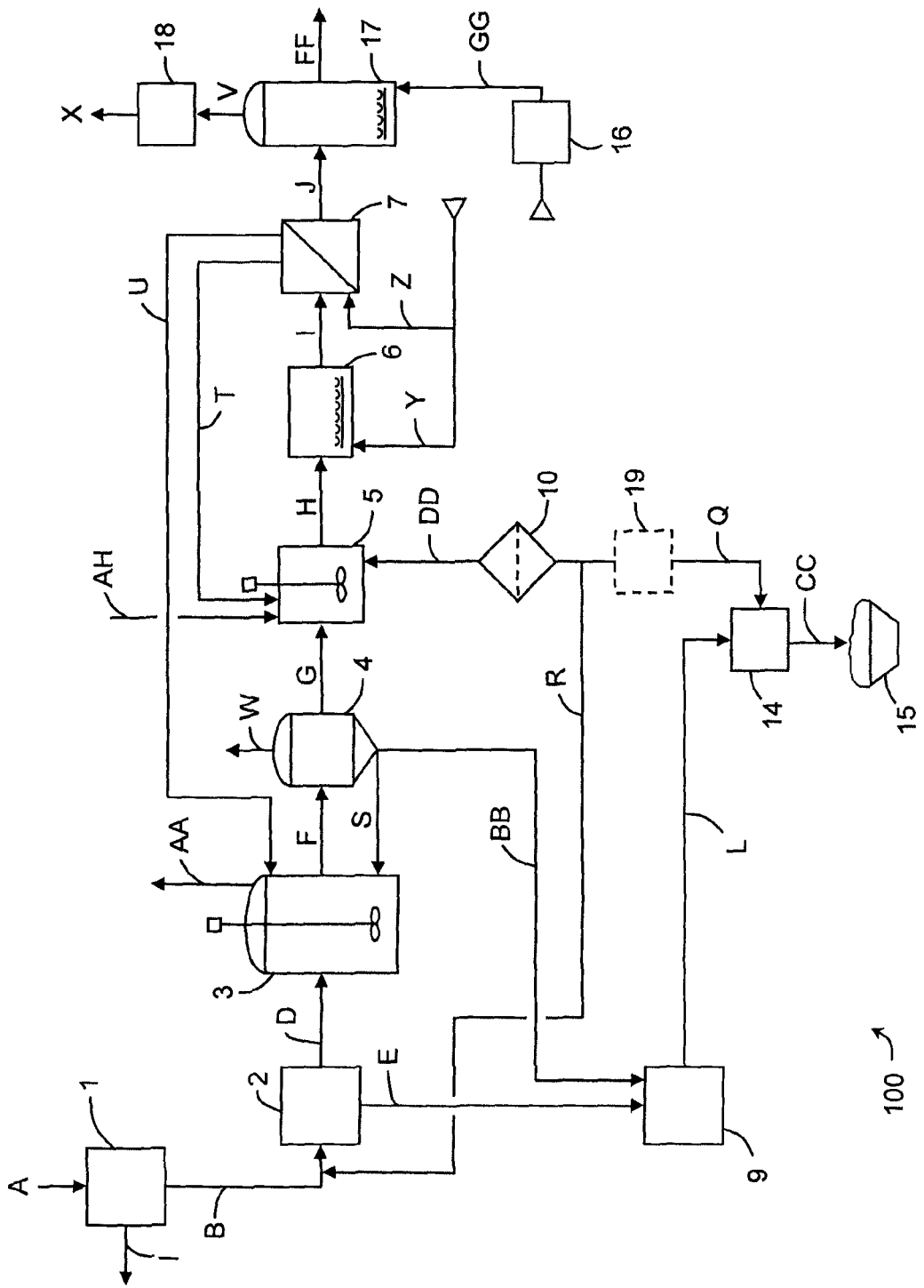
FIG. 8 is a schematic flow sheet of a treatment plant in which a primary flow path passes in series (but with various recycle streams) through an anaerobic digester and then through other treatment steps to remove, for example, nitrogen.
Figure 9:
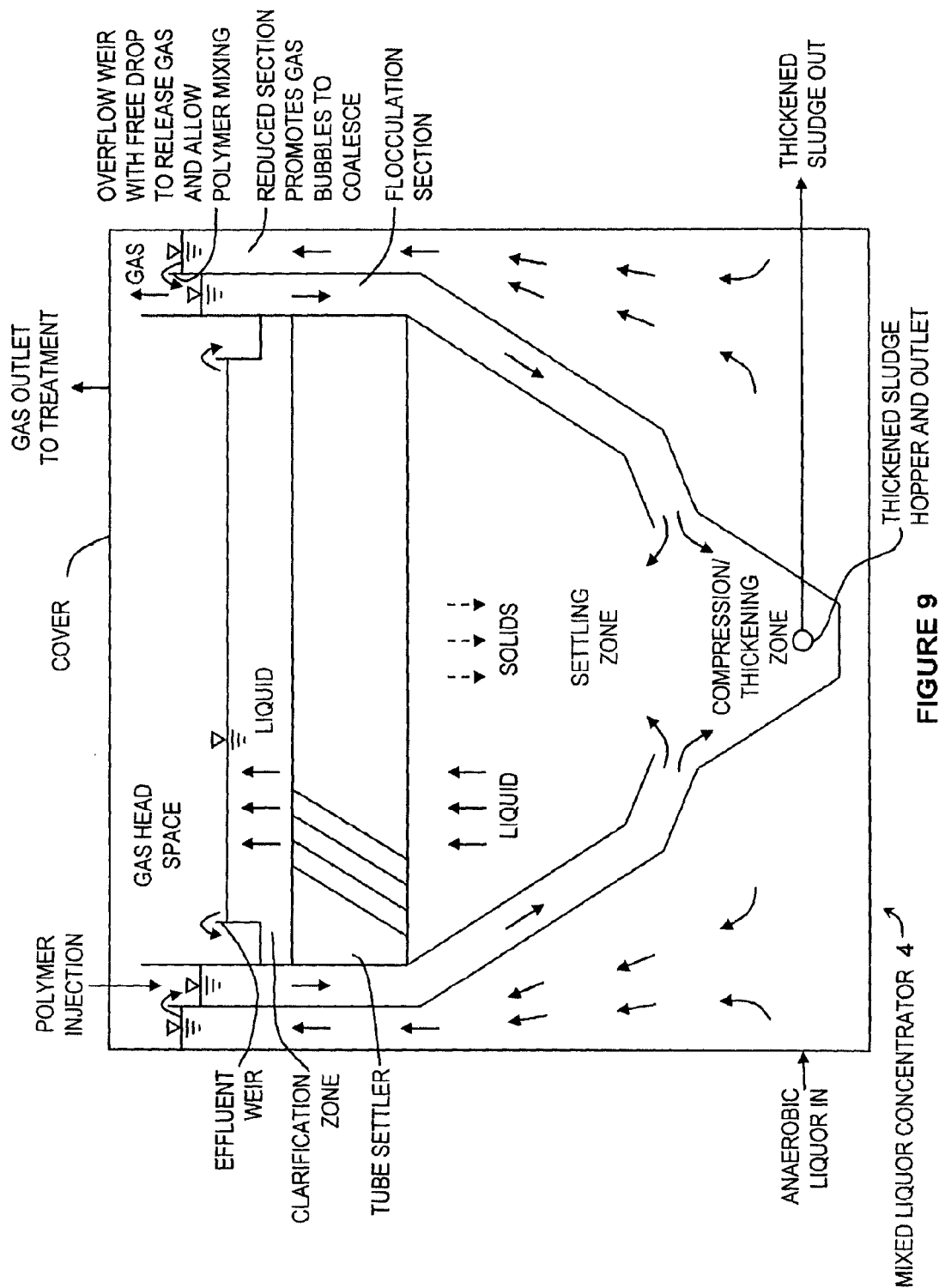
FIG. 9 is a schematic cross section of a mixed liquor concentrator used in FIG. 8.

Various wastewater treatment plants, or parts of them, are described in with reference to FIGS. 1 to 9 below. In the plants of FIGS. 1 to 7, an anaerobic digester is fed a solids enriched portion of the wastewater and a solids depleted portion of the wastewater passes through other treatment steps to remove, for example, nitrogen. In the plant of FIG. 8, the primary flow path passes in series (but with various recycle streams) through an anaerobic digester and then through other treatment steps to remove, for example, nitrogen. FIGS. 1 to 7 are believed to use less energy, and produce more biogas, when treating municipal sewage. FIG. 8, however, may also be used to treat municipal sewage, may be more adaptable to higher strength waste streams, and has various process features that may be useful in plants according to FIGS. 1 to 7 or in other plants.

Figure 1:
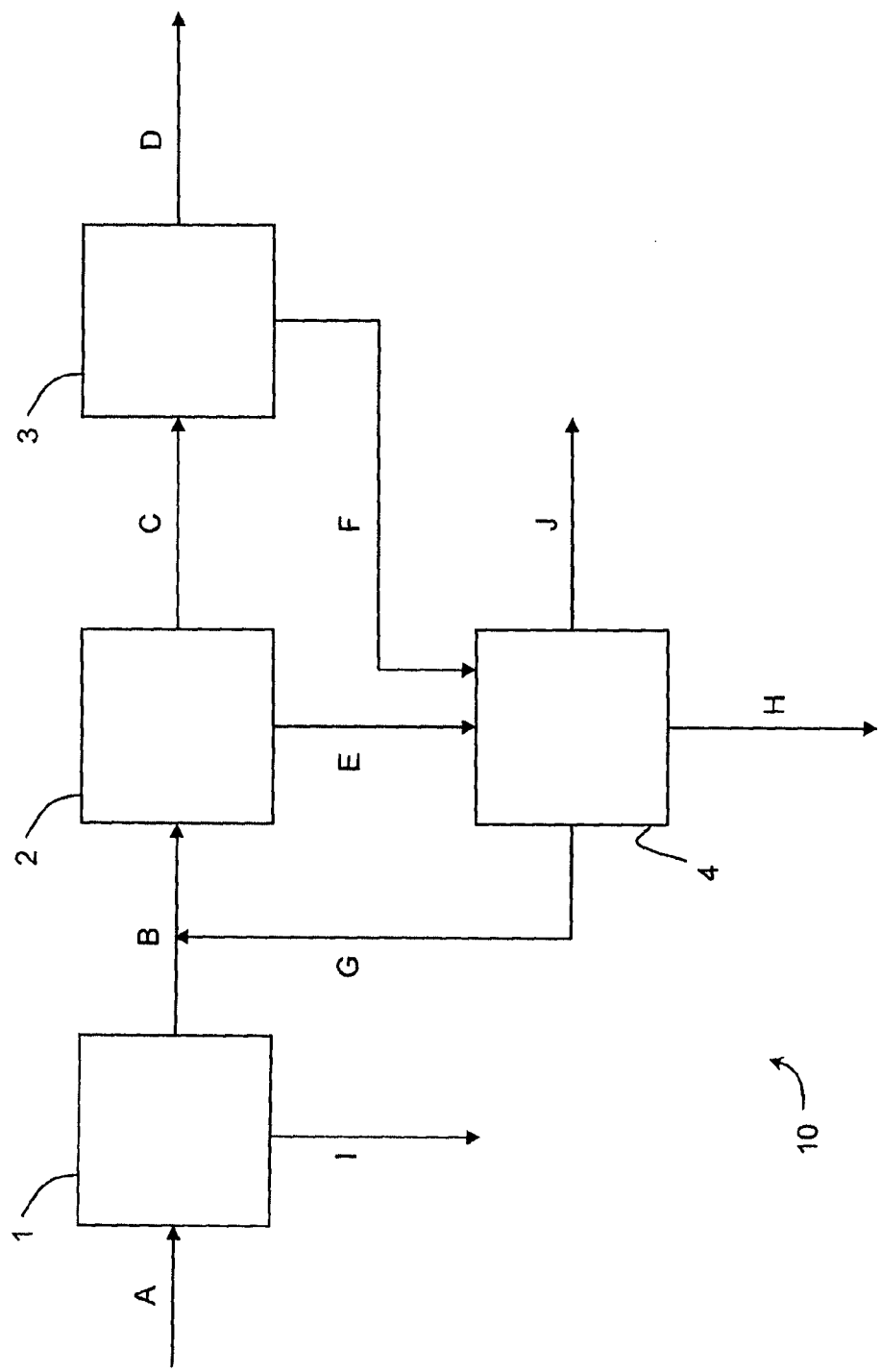
FIG. 1 is a schematic flow sheet giving an overview of a wastewater treatment plant in which an anaerobic digester is fed a solids enriched portion of the wastewater and a reduced solids portion of the wastewater passes through other treatment steps to remove, for example, nitrogen or BOD.

FIG. 1 shows a wastewater treatment plant 10. The plant 10 has various unit process components and process streams to be further described below.

The plant 10 has a process flow that is generally similar, at an overview level, to more detailed flow sheets given in FIGS. 2 to 8. The flow sheets in FIGS. 2 to 8 may differ from one or more details of FIG. 1, but a description of FIG. 1 may still be useful in understanding FIGS. 2 to 8.

In the plant 10, a raw influent A, which may be municipal sewage or another low strength wastewater, enters a preliminary treatment area 1. The preliminary treatment may include, for example, coarse screening of the raw influent A and grit removal from the raw influent A. Coarse screenings may be washed and compacted, and the grit may be washed. The coarse screenings and grit leave the plant 10 through washed and compacted screenings and grit stream I for disposal.

Preliminary treated effluent stream B, comprising screened and de-gritted sewage, flows to an enhanced primary treatment (EPT) area 2. EPT area 2 removes suspended organic matter, preferably including colloidal matter, to reduce the total suspended solids (TSS) and BOD of the preliminary treated effluent stream B, preferably to a greater extent than conventional primary clarifiers typically do in conventional activated sludge wastewater treatment plants. Primary clarifiers in activated sludge processes, even if operated with some chemical enhancement to provide more than ordinary removal, typically remove less than 50% of the BOD and 70% of the TSS of preliminary treated effluent B. EPT area 2 preferably removes 50% or more of the BOD and 70% or more of the TSS from preliminary treated effluent B. BOD removal in EPT area 2 may include at least some colloidal BOD and may be 60% or more or 70% or more. TSS removal in EPT area 2 may be 80% or more or 90% or more.

The various flow sheets in FIGS. 2 to 8 will use one of three examples of configurations for EPT area 2, although other primary treatments might also be used. One configuration is chemically enhanced micro-screening, using micro-screens and adding coagulant or flocculant or both. Another configuration is chemically enhanced primary clarification using conventional primary clarifiers but with adding coagulant or flocculant or both. Another configuration uses solids contact aeration and sedimentation or screening, using a brief period of aeration to promote the creation of bacteria-produced exo-cellular polymers and adsorption instead of chemical coagulants or flocculants. EPT area 2 produces a primary effluent C and a primary sludge E.

Figure 2:
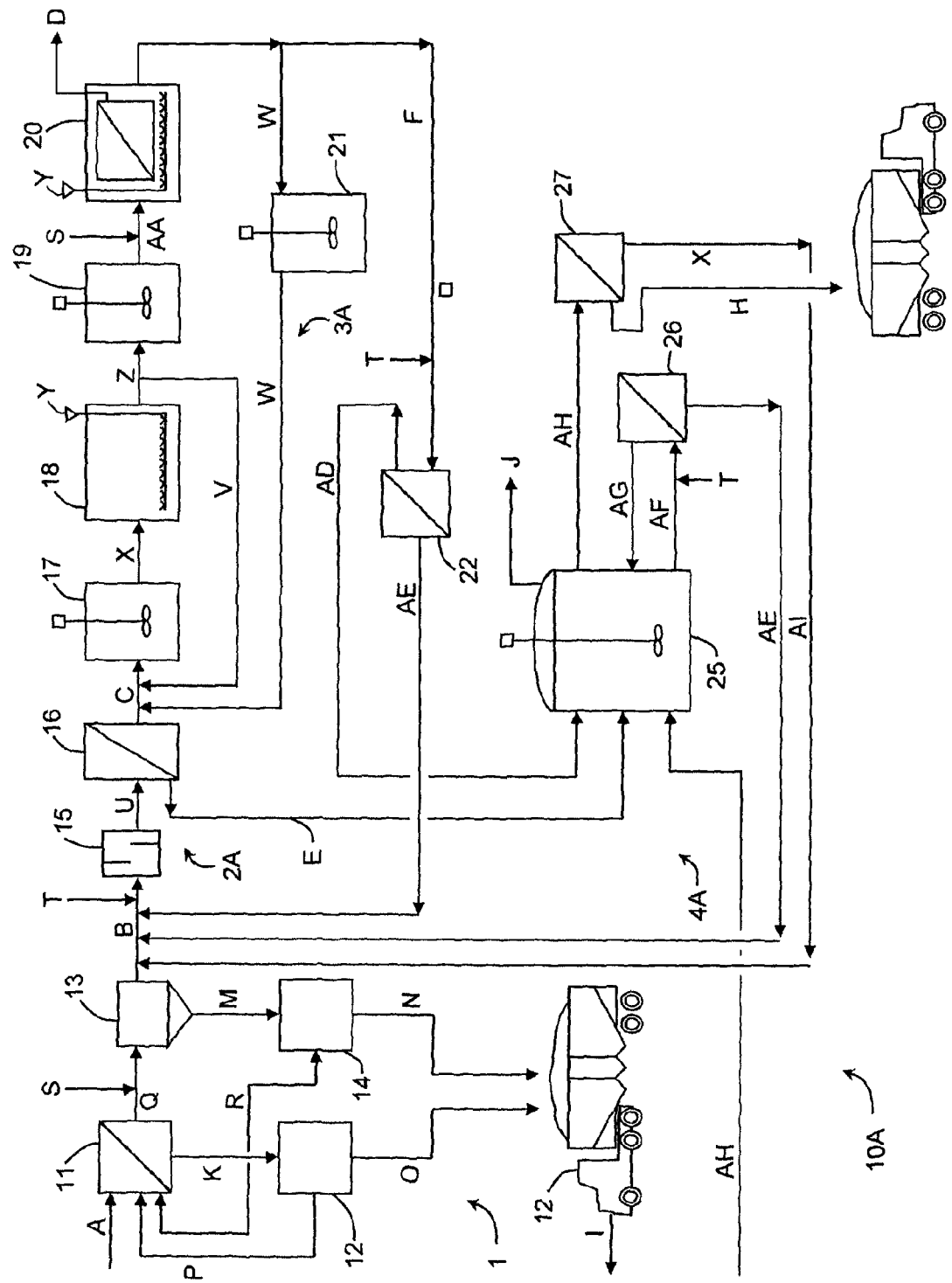
FIG. 2 is a schematic flow sheet of a treatment plant generally according to the overview of FIG. 1 having a chemically enhanced micro-screen, nitrogen removal by nitritation and membrane separation, and an anaerobic digester with recuperative thickening.
Figure 3:
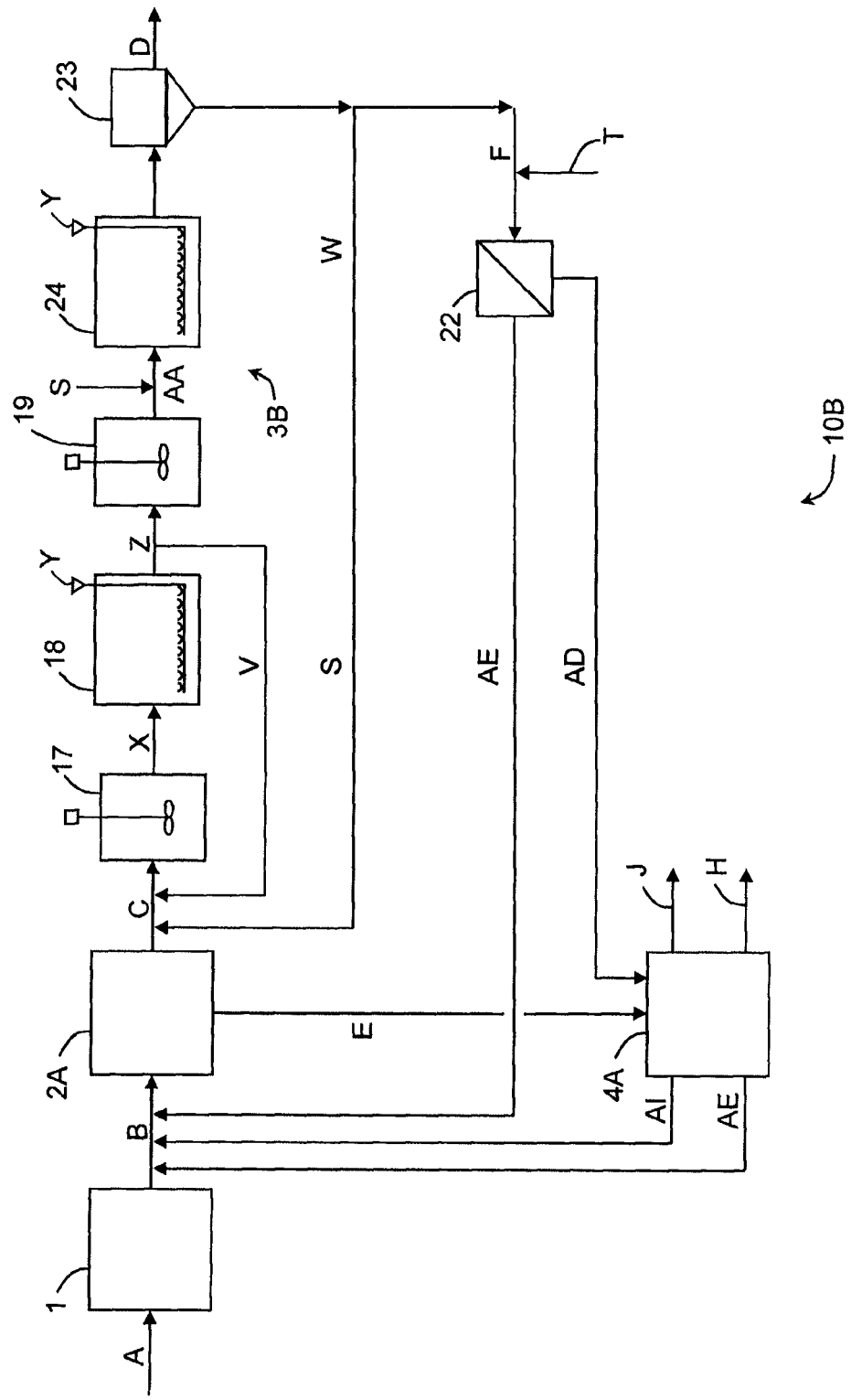
FIG. 3 is a schematic flow sheet of a variation of the plant of FIG. 2 replacing the membrane separation step with a clarifier.
Figure 4:
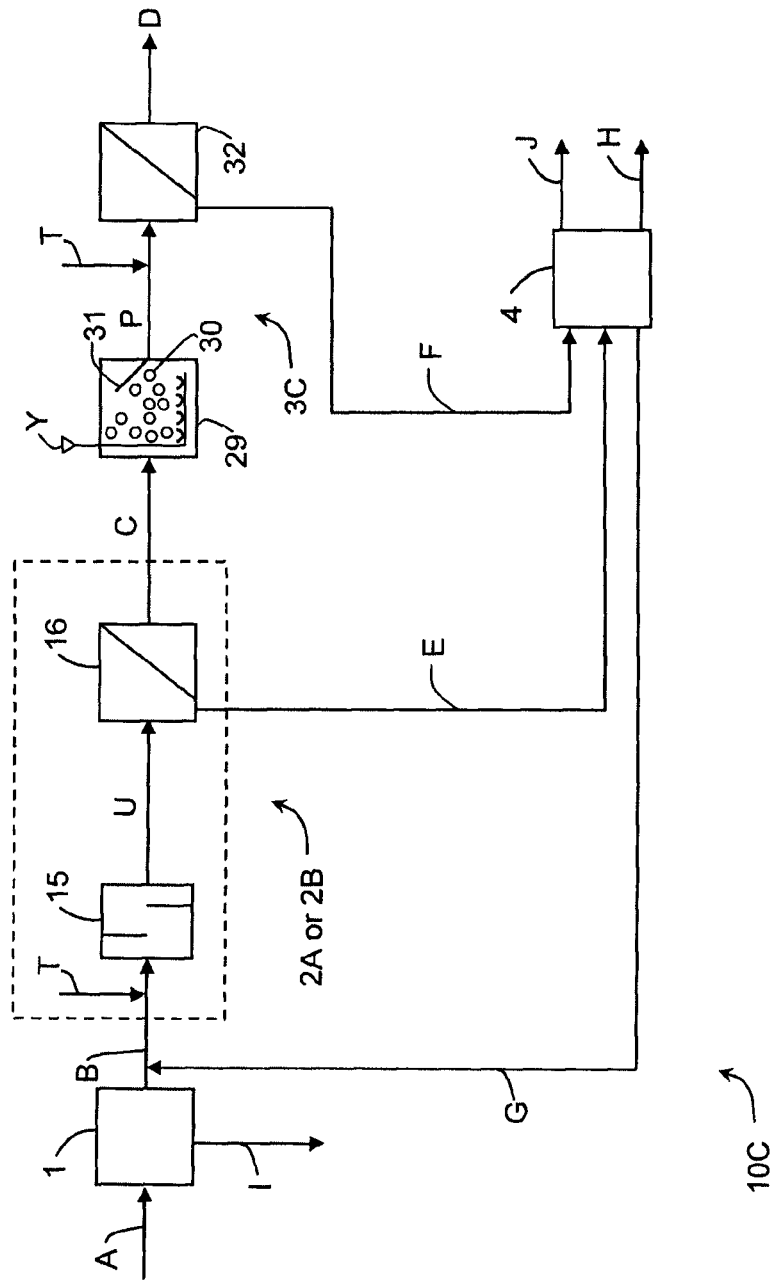
FIG. 4 is a schematic flow sheet of a treatment plant generally similar to the overview of FIG. 1 using an MBBR for secondary treatment followed by a micro-screen for final solids separation.
Figure 5:
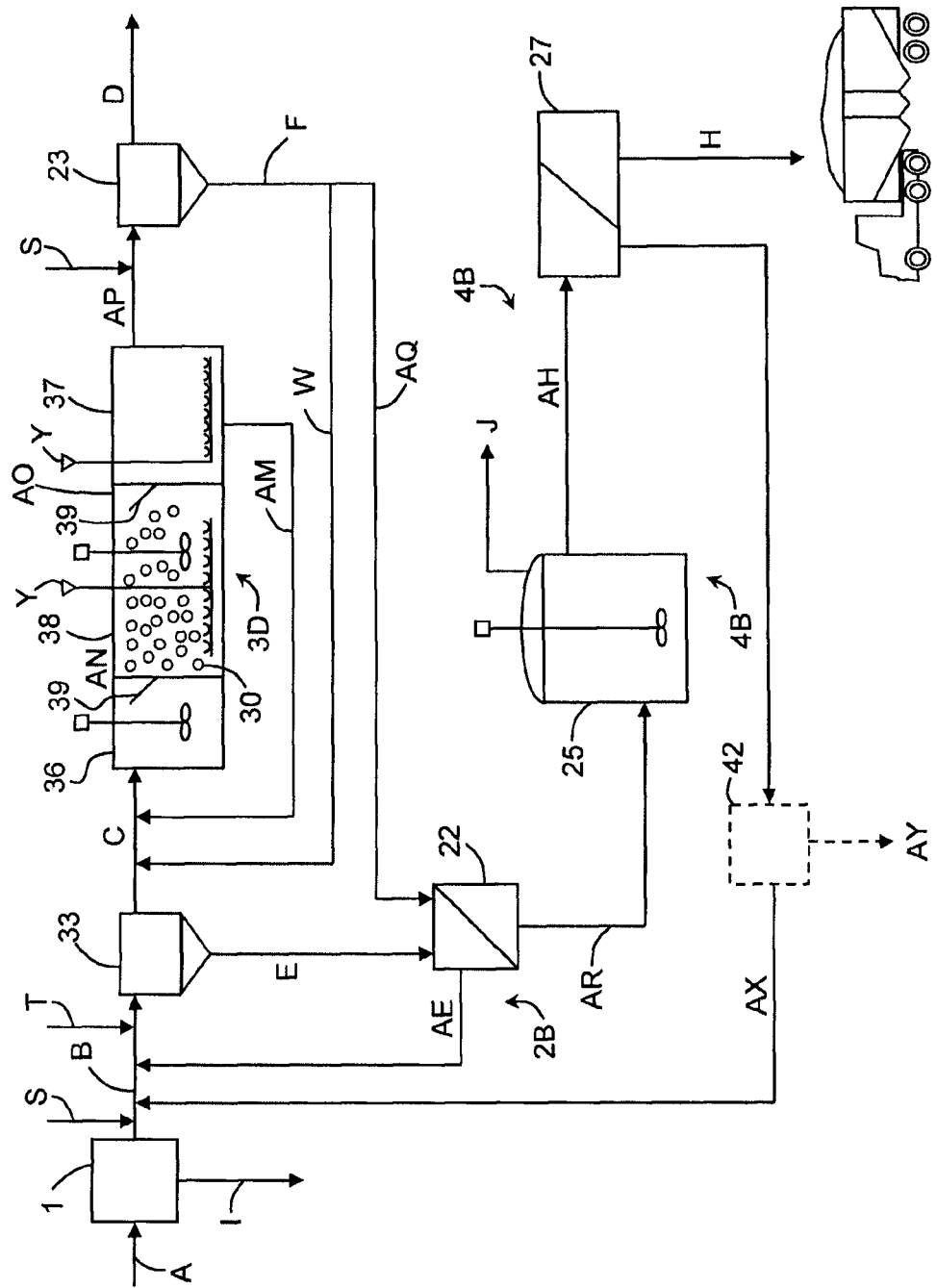
FIG. 5 is a schematic flow sheet of a treatment plant generally similar to the overview of FIG. 1 using an IFAS reactor with annamox bacteria and a secondary clarifier for final solids separation.

Primary effluent C flows to a secondary, or biological, treatment area 3. Secondary treatment is used to remove one or more remaining contaminants in primary effluent C such as BOD, nitrogen or phosphorous. Secondary treatment may also include a further solids separation step. Nitrogen removal from primary effluent C may use, for example, a nitritation and de-nitritation process as shown in FIGS. 2 and 3. FIGS. 4 to 6 comprise treatments with annamox bacteria. In these Figures, de-ammonification may be used for bulk nitrogen removal with nitrification and denitrification for polishing. Phosphorous removal, which may be adapted to other flow sheets, may be biological or chemical, and may include recovering phosphorous as struvite (magnesium ammonium phosphate or MAP). FIGS. 7 and 8 use MBBR reactors for applications where nitrogen removal is not required. Final solids separation in the secondary treatment area 3 may be done using, for example, a secondary clarifier, membranes or a chemically enhanced micro-screen. Secondary sludge F from secondary treatment are 3 goes to an anaerobic digestion area 4. Final effluent D is sent for disposal or reuse, optionally after further treatment steps such as disinfection.

Anaerobic digestion area 4 treats the primary sludge E and secondary sludge F by anaerobic digestion, preferably including influent or recuperative sludge thickening and effluent sludge dewatering. The digestion may occur in a single stage or two stage digester. The digestion is preferably performed at an enhanced solids concentration caused by one or more of thickening the primary sludge E, thickening the secondary sludge F, recuperative thickening involving a recycle of solids separated from an effluent stream or co-digestion of additional waste. Waste digested sludge is typically dewatered. A digester return stream G, comprising for example dewatering liquid produced in the waste sludge dewatering process and any influent or recuperative thickening effluents, is returned to the liquid train streams B or C for further treatment. A dewatered and digested sludge cake H is typically sent for drying, composting or disposal. Anaerobic digester gas, or biogas, J produced in the anaerobic digestion block 4 is preferably used as a fuel, for example as fuel for an onsite combined heat and power generation unit or by upgrading to natural gas pipeline standards.

Each of FIGS. 2 through 8 specify a preliminary treatment, a primary treatment, a secondary treatment and a form of anaerobic digestion. However, it is generally possible to create a process by combining a preliminary treatment from any of FIGS. 2 through 8, with a primary treatment from any of FIGS. 2 through 8, with a secondary treatment from any of FIGS. 2 through 8 and anaerobic digestion according to any of FIGS. 2 through 8. However, some exceptions or preferred combinations may be noted in the descriptions of the Figures. Compatible process details of FIG. 9, although FIG. 9 describes a process that is not according to FIG. 1, may also be combined with processes according to FIG. 1.

Of the various primary treatment processes, chemically enhanced microscreening is preferred because it can reliably remove a large percentage of BOD and TSS. Of the secondary treatment processes, the nitritation and annamox processes both provide a very efficient removal of nitrogen, but the nitritation process is preferred because populations of annamox bacteria can take a long time to establish and can be difficult to maintain. The MBBR process is preferred when nitrogen removal is not required. Of the aerobic digestion processes, a single stage reactor with recuperative thickening is preferred since some thickening is useful to promote efficient digestion, recuperative thickening results in lower ammonia concentrations in the digester than influent thickening, and the solids content is likely to be below a concentration in which two stage digestion becomes appropriate. Accordingly, FIGS. 2 and 3 are believed to provide the generally preferred processes among FIGS. 2 to 8, but the other processes may be more desirable in applications where considerations other than those discussed above are important.

FIG. 2 shows a plant 10A generally according to FIG. 1 but with specific features to be described below. There are two concepts exemplified in FIG. 2 (and other plants according to FIG. 1) associated with reducing the energy required to treat municipal sewage, and at the same time increase the energy that can be extracted from the sewage by maximizing biogas generation. The first concept is to conduct primary treatment so as to maximize the removal of suspended and colloidal solids that remain in sewage after preliminary treatment, and direct these solids in primary sludge to efficient anaerobic digestion. The enhanced primary treatment reduces the BOD and COD loading to the secondary treatment. The second concept is to treat the primary effluent with a secondary treatment system that has reduced oxygen demand compared to conventional nitrification and denitrification, and has a reduced carbon (BOD) demand for nitrogen removal if nitrogen removal is required.

The plant 10A begins with raw influent A flowing into preliminary treatment area 1. The specific steps involved in preliminary treatment area 1 are not critical and can include common unit process such as coarse screening an grit removal that occur in the headworks of typical large municipal wastewater treatment plants. In the plant 10A, raw sewage A is treated through a coarse screen 11, such as a 6 mm bar or step screen. The coarse screen 11 removes large contaminants, trash and debris such as plastic, glass, metals or other larger particles of un-digestible solids. These contaminants are removed so that they do not end up in the cake H containing solids removed with waste anaerobic sludge. Large contaminants would interfere with disposal, for example by land application, of the cake H or interfere with a sludge cake drying and pelletizing process.

Coarse screenings K removed from the coarse screen 11 flow to a screenings washer and compactor 12. This device may include, for example, an inclined screw conveyor that washes and compacts the coarse screenings K. Small organics return to the influent stream in a screenings return stream P. The screenings compactor 12 reduces the mass and volume of screenings in a washed and compacted screenings stream O going to disposal. Screenings logs in the screenings stream O are dropped into a screenings and grit dumpster 12 for temporary storage before disposal as washed and compacted screenings and grit I.

Coarse screened sewage Q flows to a grit chamber 13. The grit chamber 13 may be an aerated or vortex type grit chamber 13. The grit chamber 13 is used to remove grit and sand that would otherwise accumulate in the anaerobic reactor area 4. Raw grit M flows from the grit chamber 13 to a grit washer and classifier 14. Plant utility water, typically disinfected final effluent D, is used to wash the grit. Grit washwater R with organics removed from the grit is sent to the influent upstream of the coarse screen 11. Washed grit N goes to the dumpster 12 for storage until disposal. Washing is required to reduce organics in the dumpster 12.

The preliminary treated effluent B flows to enhanced primary treatment area 2A. Enhanced primary treatment is aimed at removing suspended and colloidal organic matter in the preliminary treated effluent B to reduce its TSS and BOD concentrations. A preferred method of treatment is chemically enhanced micro-screening (CEMS). Coagulant S, for example ferric chloride, is added to the preliminary treated effluent. The coagulant S may be added prior to the grit chamber 13 to facilitate dispersion of the coagulant S with the mixing in the grit chamber 13. Preliminary treated effluent B enters a flocculation channel 15 where a small dose of polymer is added to enhance the formation of flocs such that suspended and colloidal solids can attach by adsorption. The flocculated wastewater U goes to a micro-screen 16 such as a fine mesh drum screen or belt filter with openings smaller than about 80 microns. The micro-screen 16 retains solids and an air knife dislodges the solids retained on the screen. Additionally, a hot water spray that operates intermittently for short periods of time may be used to dissolve and remove grease that adheres to the micro-screen 16. The solids removed from the micro-screen 16 form primary sludge E with a solids concentration ranging from 2 to 6% dry solids (DS). The primary sludge E is mechanically conveyed out of the micro-screen 16 and pumped to the anaerobic digestion area 4A. CEMS can remove 60% or more of the BOD and 80% or more of the TSS from preliminary treated effluent B. Table 1 shows CEMS results with a 40 micron micro-screen 16 and using 15 mg/L ferric chloride coagulant S and 1 mg/L cationic polymer T. As indicated in Table 1, the addition of an iron salt results in the removal of up to 70% of the total phosphorous in addition to removing BOD and TSS.

TABLE 1

CEMS Performance

| Parameter | Unit | Degritted Sewage | CEMS Effluent | Percent Removal |
|---|---|---|---|---|
| TSS | mg/L | 242 | 20 | 92% |
| VSS | mg/L | 197 | 16 | 92% |
| COD | mg/L | 517 | 211 | 59% |
| BOD | mg/L | 310 | 124 | 60% |
| TKN | mg/L | 45 | 40 | 11% |
| NH4 | mg/L | 30 | 30 | 0% |
| TP | mg/L | 10 | 3 | 70% |

In FIG. 2, primary effluent C passes through micro-screen 16 and flows to a secondary treatment area 3A. Secondary treatment area 3A includes biological nitrogen removal, chemical phosphorous removal and membranes to separate and retain solids. All of the reactors or zones in the biological treatment train can be part of a common non-covered plug flow biological treatment tank with baffles used to separate the zones. The nitrogen removal process shown in FIG. 2 is a separate stage nitratation-denitritation process with pre- and post-denitritation and an aerobic polishing stage.

Primary effluent C flows to an pre-anoxic reactor 17 for denitritation. The hydraulic retention time (HRT) of the pre-anoxic reactor 17 when modeled at 15 degrees Celsius ranges from 1.5 to 2 hours. The pre-anoxic reactor 17 can be mixed with top entry or submersible mixers. In the pre-anoxic reactor 17, heterotrophic nitrite and nitrate reducing bacteria use BOD present in primary effluent C as a carbon source to convert both oxidized nitrogen forms into nitrogen gas. Nitrite enters the pre-anoxic reactor 17 with an internal recycle V at a rate of twice the average forward flow rate (2Q) from a nitritation reactor 18. Nitrate enters the pre-anoxic reactor 17 with return mixed liquor W from a membrane tank 20 at twice the average forward flow rate (2Q).

De-nitrified anoxic mixed liquor X flows to the nitritation reactor 18. Nitritation reactor 18 is a suspended growth reactor that selects for ammonia oxidizing bacteria (AOB) by maintaining a dissolved oxygen (DO) concentration below 0.5 mg/L, typically about 0.2 mg/L. This low DO concentration selects against the growth of nitrite oxidizing bacteria (NOB). Supplied air Y transfers oxygen to the water column by bubbles produced from fine bubble diffusers. The mixed liquor concentration (MLSS) in nitritation reactor 18 may be 6000 to 9000 mg/L. The HRT may be 2.5 to 4 hours depending on temperature and raw influent A nitrogen content.

Nitritated mixed liquor Z flows to a post-anoxic reactor 19 for denitritation and to internal recycle V, which is pumped to the pre-anoxic reactor 17. The internal recycle V carries nitrite to the front end of the secondary process. In the post anoxic reactor 19, nitrite is reduced to nitrogen gas by heterotrophic anoxic bacteria. Endogenous decay of the bacteria in this reactor produce the soluble BOD needed as a carbon source to reduce the nitrite. The post-anoxic reactor 19 is mixed with top entry or submersible mixers. The HRT is 2.5 to 4 hours depending on temperature and nitrogen content.

Denitritated mixed liquor AA goes to a membrane tank 20 for aerobic polishing and solids separation. Membrane tank 20 contains immersed micro- or ultra-filtration membranes for solids separation. Air Y used to scour the membranes also supplies the oxygen needed to oxidize ammonia and nitrite entering the reactor to nitrate. If further phosphorous removal is required, a coagulant S such as ferric chloride or another metal salt can be dosed upstream of the membrane tank 20. Permeate passing through the membranes becomes the final effluent D and may be sent to disinfection. Return mixed liquor W at twice the average forward flow returns from the is the membrane tank 20 to the head of the secondary treatment area 3A. The return mixed liquor W avoids over-thickening the mixed liquor in the membrane tank 20 and reduce the nitrate content in the final effluent D. The membrane tank 20 operates at 10,000 to 14,000 mg/L MLSS. HRT of the membrane tank is 1 to 2 hours.

If the membranes use more air for scouring than is necessary to supplement the biological oxygen demand in the membrane tank 20, the return mixed liquor W will have a high DO concentration. If this is the case, the return mixed liquor W passes through a small de-oxygenation tank 21. The DO in the membrane tank 20 depends on the air scouring system specified by the membrane supplier. If return mixed liquor W DO is 2 mg/L, then the de-oxygenation tank HRT is 20 minutes. The return mixed liquor W has an oxygen uptake rate of approximately 40 mg/L-hr and will rapidly deplete the dissolved oxygen in the de-oxygenation tank 21. The de-oxygenation tank is mixed with a top entry or submersible mixer. De-oxygenated mixed liquor return W goes to the pre-anoxic reactor 17.

A portion of the return mixed liquor W is removed as secondary sludge F. Table 2 shows modeled parameters for the secondary treatment flow in FIG. 2 using membranes and at 15 degrees C. and treating 1 MGD.

TABLE 2

Performance of Secondary Treatment Area 3A

| Parameter | Unit | Primary Effluent | Pre-Anoxic | Micro-Aerobic Nitritation | Post Anoxic | Membrane Tank | De Oxygenation | Final Effluent |
|---|---|---|---|---|---|---|---|---|
| Flow | [MGD] | 1.00 | 5.00 | 5.00 | 3.00 | 1.00 | 2.00 | 1.00 |
| OUR (total) | [mg/L/hr] | | 0.44 | 39.80 | 0.17 | 47.48 | 19.81 | |
| DO | [mg/L] | | 0.00 | 0.20 | 0.00 | 2.00 | 0.12 | 2.00 |
| Liq. Vol. | [MG] | | 0.06 | 0.16 | 0.15 | 0.06 | 0.008 | |
| HRT | (hrs) | | 1.44 | 3.84 | 3.60 | | 0.192 | |
| VSS | [mg/L] | 16 | 5896 | 5893 | 5887 | 8823 | 8822 | 0 |
| TSS | [mg/L] | 20 | 7339 | 7336 | 7330 | 10988 | 10987 | 0 |
| sBOD | [mg/L] | 114 | 4.9 | 1.0 | 0.6 | 0.8 | 0.7 | 0.8 |
| NH3—N | [mg/L] | 33 | 7.7 | 2.3 | 3.1 | 0.2 | 0.1 | 0.2 |
| NO3—N | [mg/L] | 0 | 0.2 | 1.9 | 0.4 | 3.5 | 3.5 | 3.5 |
| NO2—N | [mg/L] | 0.1 | 0.1 | 3.1 | 0.5 | 0.2 | 0.1 | 0.20 |
| TKN | [mg/L] | 40 | | | | 2 | | 2 |
| CODt | [mg/L] | 211 | | | | 26 | | 26 |
| BODt | [mg/L] | 124 | | | | 1 | | 1 |

FIG. 3 shows another plant 10B. Plant 10B is generally the same as plant 10A but membrane tank 20 and de-oxygenation tank 21 are not used. In their place, a secondary clarifier 23 is used. A small aerobic polishing tank 24 is also added after the post anoxic reactor 19. Return mixed liquor W from the secondary clarifier 23 to the pre-anoxic reactor 17 is 0.5 to 1.5 times the average forward flow. The mixed liquor suspended solids is 2000 to 3000 mg/L. The DO in the aerobic polishing tank 24 can be better controlled by using tapered aeration than in the membrane tank 20. Return mixed liquor W can be returned at low DO without the need for a de-oxygenation tank 21.

Nitritation uses 25% less oxygen than nitrification by oxidizing the ammonia partially to nitrite and not to nitrate. The low DO in the nitritation reactor 18 allows for efficient oxygen transfer due to a high DO gradient with the supplied air Y. This further reduces the air flow and aeration energy required, compared to a nitrification reactor that typically operates at 2 mg/L DO. The process in FIG. 2 has an oxygen demand of 1870 lbs per MG treated and produces an effluent with 5.6 mg/L total nitrogen (TN). For comparison, a conventional nitrification-denitrification activated sludge process with primary clarifiers has a demand of 2300 lbs per MG treated and produces effluent with 10 mg/L. Denitritation (over nitrite) also consumes 40% less carbon than denitrification (over nitrate). In the process of FIG. 2, about 70% of the incoming ammonia is removed over nitrite and 30% over nitrate. This reduces the overall carbon demand by approximately 30% compared to conventional nitrification-denitrification. Since a larger fraction of the BOD is retained in the micro-screen 16 and sent to the anaerobic digester area 4A, there is less carbon available for nitrogen removal. The use of nitritation-denitratation is thus particularly advantageous in combination with enhanced primary treatment.

Secondary sludge F is pumped to an anaerobic digestion area 4A. A thickener 22 increases the solids content of the secondary sludge F from between about 1 to 1.4% to between about 4 to 5%. Rotary drum thickeners are preferred, but any waste activated sludge (WAS) thickening device such as dissolved air flotation or a gravity belt thickener can be used. Polymer T is added to the secondary sludge F upstream of the thickener 22. Thickened secondary sludge AD is fed to an anaerobic digester 25. The digester 25 is preferable operated at a mesophilic or thermophilic temperature, adding heat if necessary. The thickener filtrate AE returns to primary treatment area 2A for TSS removal. The primary sludge E is also pumped to the digester 25.

The digester 25 operates with a high solids content by using a recuperative thickener 26. The recuperative thickener 26 can be a screw or a drum thickener, or a centrifuge thickener. Digestate AF is pumped from the digester 25 to the recuperative thickener 26 and thickened sludge AG is returned to the digester 25. Polymer T is added to the digestate 27 to improve the thickening. The thickener filtrate AE returns to the primary treatment area 2A for TSS removal.

The digester 25 may operate at a solids content in the digester 25 of 4% DS or more, for example a 5 to 6% solids content. This produces a solids retention time (SRT) in excess of 40 days based on conventional digester sizing for waste activated sludge digesters based on the raw influent flow rate. Up to 65% of the volatile solids fed with the primary sludge E and thickened secondary sludge F may be destroyed. Alternatively, a smaller digester may be used down to an SRT of about 20 or 25 days. In a case where the plant 10A is being retrofit to replace an existing wastewater treatment plant, operating the digester 25 with a high solids concentration creates capacity in an existing digester to receive larger amounts of co-digestion waste AH, such as grease or other high-strength industrial waste, that can be co-digested with plant 10A sludges EF to further increase gas production.

The high solids content of the digestate 27 produces viscosities in excess of 400 centi-Poise (cP), which is not mixable with conventional gas injection or pump/jet mixing devices. Low speed, high torque submersible mixers operated with hydraulic motors such as those produced by UTS Products GmbH in Lippetal, Germany are ideally suited for this application. To access the mixers, service boxes also manufactured by UTS Products GmbH are used to avoid releasing biogas from the digester head space.

Waste digestate AH is taken from the digester 25 to a dewatering unit 27 such as a screw press, belt press, centrifuge, or other dewatering unit. Dewatering filtrate AI returns to the primary treatment area 2A. Sludge cake H may be loaded into a truck 28 for disposal as composting or land application, or can be further dried to produce pellets for fuel or fertilizer use.

The digester 25 may have an HRT of about 20 days HRT and an SRT of about 40 days. Volatile solids reduction (VSR) may reach 65% for the combined primary sludge E and thickened secondary sludge AD. The CEMS and secondary treatment area 3A generate about 15% more volatile solids going to digestion than in a conventional nitrification-denitrification (N/dN) activated sludge process with primary clarifiers. CEMS produces about 50% more VSS than a primary clarifier and the secondary nitirtation-denitritation produces about 60% less secondary sludge VSS than a conventional N/dN activated sludge process. Primary sludge volatile solids are more digestable than WAS. Combined with the net increase in VSS production, this results in higher methane production than a conventional activated sludge N/dN process. If primary and secondary sludges were treated in a conventional 20 day SRT anaerobic digester without regenerative thickening and a typical VS destruction rate of about 50%, a conventional N/dN activated sludge process would produce about 5.1 scfm of methane per MG of sewage treated. In contrast, primary sludge E and secondary sludge F from the plant 10A would produce about 6.2 scfm of methane per MG of sewage treated using the same 20 day SRT digester. However, treating the primary sludge E and secondary sludge F from the plant 10A using a digester of the same size but with recuperative thickening to provide a 40 day SRT and 65.5% VSR produces about 7.8 scfm of methane per MG of sewage treated. The plants 10A and 10B may require little or no net energy, or may have a net production of energy. Using a 41% electrically efficient engine-generator, the biogas J generated in FIG. 2 would produce 52 kW of electricity per MG of sewage treated.

Table 3 shows modeled performance parameters for the high solids digester 25 operated at 35 degrees C. associated with 1 MGD of raw influent flow.

TABLE 3

High Solids Mesophilic Digester Performance

| Parameter | Unit | Primary Sludge | Thickened WAS | Combined Feed | Thickened Digester | Dewatering Filtrate | Dewatered Cake |
|---|---|---|---|---|---|---|---|
| Flow | gpd | 3500 | 1100 | | 4600 | 4300 | |
| Liquid Volume | gal | | | | 90000 | | |
| HRT | days | | | | 20 | | |
| SRT | days | | | | 40 | | |
| Digester gas | scfm | | | | 12.5 | | |
| Methane | % | | | | 63 | | |
| CO2 | % | | | | 36 | | |
| VSS Reduction | % | | | | 65.0 | | |
| VSS | % | 5.3 | 1.9 | 4.5 | 3.2 | 0.10 | 14 |
| TSS | % | 6.6 | 2.4 | 5.6 | 5.3 | 0.16 | 22 |
| sBOD | mg/L | | | | | 73 | |
| NH3—N | mg/L | | | | 736 | 736 | |
| PO4—P | mg/L | | | | 721 | 721 | |
| TKN | mg/L | | | | | 806 | |
| CODt | mg/L | | | | | 1684 | |
| BODt | mg/L | | | | | 325 | |
| VSS | lb/d | 1550 | 175 | 1725 | | 36 | 610 |
| TSS | lb/d | 1919 | 218 | 2136 | | 56 | 1020 |

FIG. 4 shows another plant 10C. Plant 10C uses the same preliminary treatment area 1 and secondary treatment area 2A as in FIG. 2. However, a secondary treatment area 3C is intended to remove BOD and TSS from the raw influent A without intentionally removing nitrogen. The process has a low rate of energy consumption and a high rate of biogas production such that the energy balance may be neutral or positive. There are many waste water treatment plants throughout the world that have specified BOD and TSS effluent requirements, usually 30 mg/L BOD and 30 mg/L TSSS or lower, but their effluent is not regulated for nitrogen or phosphorous. There are also plants that, while not having nutrient removal requirements in their discharge, supply recycled water, usually for unrestricted irrigation. Recycled water may have low TSS and turbidity limits, and stringent disinfection requirements, but nitrogen or phosphorous in the effluent may be desirable.

Plant 10C has lower energy consumption than a conventional activated sludge process used for carbonaceous BOD (cBOD) removal. The primary treatment area 2A and secondary treatment area 3C can be used with or without an anaerobic digestion area 4. If anaerobic digestion is used, the anaerobic digestion area 4A of FIG. 2 may be used, for example, with digester return stream G shown comprising thickener filtrate AE and de-watering filtrate AI. Using an anaerobic digestion area 4 is particularly desirable for plants above 4 MGD. At that flow rate, a plant 10C can produce 200 kW or more of electricity using an internal combustion engine and electricity production is profitable considering the cost of handling biogas and generating power. However, the processes can also be used to retrofit small activated sludge plants that were not built with anaerobic WAS digestion with the objective when they were built of reducing capital or energy cost.

The process embodied in plant 10C fractions the BOD in the raw influent A and provides sequenced removal of these fractions using unit processes that minimize energy, tank volume and the generation of solids. Using an enhanced primary treatment area 2 maximizes the removal of suspended and colloidal matter contained in wastewater after preliminary treatment (coarse screening and grit removal). This can be done with chemically enhanced micro screening, with mesh openings of 80 microns or less, as in enhanced primary treatment area 2A or by chemically enhanced primary sedimentation with coagulant and polymer added to the preliminary treated effluent B. The separated solids are preferably directed to anaerobic digestion.

To reduce the energy consumption of the plant 10C, the process avoids hydrolysis of the particulate matter (colloidal and suspended solids) that exits with the primary effluent C. If bacteria consume the particulate matter and add biomass to the system, this will increase oxygen demand. Consumption by microorganisms requires oxygen and time and produces biological solids that are more difficult to digest anaerobically, which in turn results in less biogas being produces and more solids remaining for disposal after digestion. It is preferable to biologically oxidize only the truly soluble BOD and then separate the solids that remain untreated and solids produced as biological yield from the treatment of soluble BOD.

In addition to providing an energy efficient process, the plant 10C may be retrofitted into a conventional activated sludge plant using much of the existing tankage. After coarse screening and grit removal in preliminary treatment area A, preliminary treated effluent B is directed to a chemically enhanced primary sedimentation (CEPS), which will be described further as EPT area 2B below with reference to FIG. 5, or to CEMS as described for EPT area 2A in FIG. 2, both using low doses of coagulant S and polymer T. Existing primary sedimentation tanks, or screens installed in these tanks or influent channels, may be used for the primary treatment area 2. The primary treatment preferably removes 80% or more of the TSS and 60% or more of the COD from the preliminary treated effluent B. CEPS or CEMS will remove most of the particulate COD and a portion of the filtered COD. The portion of the filtered COD that can be physically removed is colloidal matter that coagulates and flocculates with the addition of chemicals and then settles in a primary sedimentation tank (clarifier) or is retained by a micro-screen. The addition of 15 mg/L ferric chloride and 1 mg/L polymer adds about 60 lbs/d of chemical TSS per MGD treated. This is about a 3% increase in primary solids production.

Primary effluent C has a small concentrations of TSS and colloidal solids and a major portion of the truly soluble BOD from the raw influent A. The primary effluent C is directed to a high rate moving bed bioreactor (MBBR) 29 with plastic media 30 preferably at a high fill ratio, for example 60 to 70% of the tank volume. The MBBR 29 operates as a flow through tank without sludge recycle. The media is retained in the MBBR 29 tank by an outlet screen 31. The attached biomass on the media 30 may be controlled only to remove soluble COD and is designed on the basis of soluble COD load in the primary effluent C. The HRT may be one hour or less. The loading may be up to about 12 g filtered COD/m2-day. Using 300 m2/m3 of tank volume with a fill ratio of 60% this is a volumetric loading rate of 3.6 kg soluble COD/m3-d of tank, equivalent to an organic load of 12 to 15 kg total COD/m3 of tank per day.

Considering the loading rate further, an MBBR is ordinarily used to remove BOD, including particulate BOD, with a volumetric loading rate of about 4 kg BOD/m3 reactor per day at 15 degrees C., about 67% media fill, and an effective media specific surface area of about 335 m2/m3. This is about 15 grams of BOD per m2 of active surface area per day. On a COD basis, using a total BOD/COD ratio of 0.6 in the primary effluent C from CEMS, this would produce a volumetric loading rate of 7 kg total COD/m3 of reactor per day. After CEMS, about 90% of the COD is soluble so the soluble COD loading would be over 6 kg soluble COD/m3 reactor per day.

In FIG. 4, the MBBR 29 is highly loaded with the intent of removing only soluble COD. HRT may be 30 minutes to 90 minutes, or preferably 40 minutes to 1 hour, depending of the COD content with loadings as high as 30 g filtered COD/m2-day. Using 335 m2 of media 30 area per m3 of tank volume with a fill ratio of 67%, this is a volumetric loading rate of 12 kg soluble COD/m3 of tank per day. Considering a soluble/total COD ratio in CEMS effluent of about 0.9, this is 13 to 14 kg total COD/m3 tank-d. With a BOD/COD ratio of 0.6, this is 8 kg total BOD/m3 tank-day. An acceptable loading might be lower, perhaps down to 6 kg BOD/m3 tank-day, but is more likely to be higher, for example up to 10 kg BOD/m3 tank-day.

Air Y may be supplied to the MBBR 29 with coarse bubble diffusers to provide mixing and the oxygen needed to remove soluble COD. Alternatively, mechanical mixers may be used and the oxygen may be supplied with fine bubble diffusers. This combination improves oxygen transfer efficiency and reduces the amount of power consumed for aeration.

At a high loading rate as described above, essentially only the soluble BOD is taken up. The secondary treatment area 3C relies only on attached biomass for treatment. The attached solids that decay slough off from the media 30. The biological yield is small. The sloughed-off solids and the particulate matter not treated can be separated from the MBBR 29 effluent. One separation method is to use a secondary micro-screen 32. Solids are removed from the micro-screen 32 with an air knife to maintain a high solids content in the secondary sludge F. The secondary sludge F removed from the secondary micro-screen may go to the anaerobic digestion area 4 along with the primary sludge E or may be wasted. Dissolved air flotation or cavitation air flotation may be used as an alternative form of solids removal after the MBBR 29 but may be less practical than the CEMS especially for higher flow rates. Polymer T or coagulant S, or both, may be added to aid in the separation. For example, 4 to 6 mg/L of ferric chloride as iron and 1 mg/L of a low to medium molecular weight cationic polymer may be added before a secondary micro-screen 32. 6 to 10 mg/L as iron and 1 to 2 mg/L of low to medium molecular weight cationic polymer may be added before flotation.

Figure 4B:
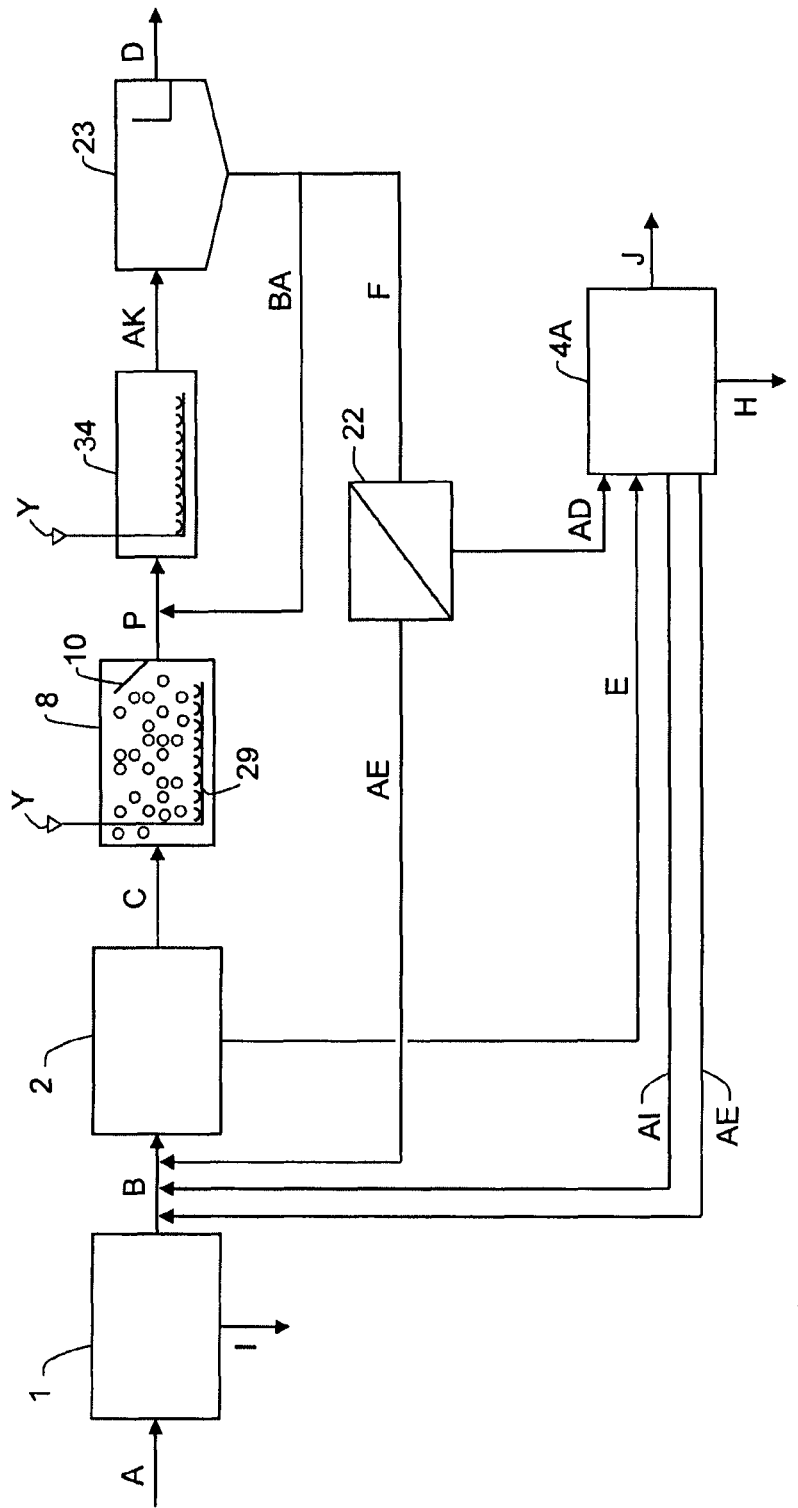
FIG. 4B is a schematic flow sheet of a treatment plant that is a variation of FIG. 4 using a solids contact aeration tank and a secondary clarifier for final solids separation.

FIG. 4B shows a plant 10-C-2 modified with a secondary treatment area 3C-2 in which the high rate soluble COD MBBR 29 is followed by a solids contact aeration tank 34 with 20 to 30 minutes of hydraulic retention time aerated with fine bubble diffusers, and followed by a secondary sedimentation tank or clarifier 23. In the solids contact tank 34, bio-flocculation is used to enable removal of suspended and colloidal solids that exit the MBBR 29. The solids contact tank 34 is shallow, usually with less than 10 ft of side water depth. The solids contact tank 34 has a length to width ratio of approximately 10 to 1. Air requirements are based on an energy gradient for gentle mixing to promote bio-flocculation and not on biological oxygen demand to oxidize the BOD. Typical air flow is 5 to 6 scfm per liner foot of channel. This is about 150 scfm of air per MGD treated. This is a fraction of the air flow that would be required to biologically oxidize the volatile suspended solids in the MBBR 29 effluent. The MLSS may be 1200 to 1800 mg/L. A solids contact tank 34 can easily be retrofitted in an existing aeration tank. The biological flocs formed in the solids contact tank 34 settle in a secondary clarifier 23, typically already existing in activated sludge plants. The return sludge flow BA from the secondary clarifier 23 to the head of the solids contact tank 34 may be 25% of the average plant flow (0.25 Q). The rest of the biomass is contained in secondary sludge F. Secondary sludge F goes to a thickener 22 prior to entering the anaerobic digester area 4. This secondary treatment concept is similar to trickling filter/solids contact (TF/SC), where the TF removes soluble BOD. In the present disclosure, soluble BOD removal is done by attached growth on the MBBR media 30 and not by a trickling filter. This enables easy retrofits in existing activated sludge plants. The secondary treatment configuration in FIG. 4A may be preferable over FIG. 4 in larger wastewater treatment plants.

FIGS. 5 to 7 employ annamox bacteria and will be described below. Referring to FIG. 5, primary treatment occurs by chemically enhanced primary clarification in a primary treatment area 2B. Coagulant S is added to preliminary treated effluent B, preferably prior to the grit chamber 13 as shown in FIG. 2. Polymer T is also added to preliminary treated effluent B before it enters a primary clarifier 33. For example, ferric chloride may be added in dosages up to 30 mg/L. Anionic or cationic polymer may be added in dosages up to 2 mg/L. Primary effluent C goes to a secondary treatment area 3D and primary sludge E goes to an aerobic digestion area 4B. This configuration for primary treatment may be less effective than CEMS, but is the easier to implement as a retrofit to an existing wastewater treatment plant. FIG. 6 uses a primary treatment area 2A as described with FIG. 2.

Primary treatment in FIG. 7 is by way of solids contact aeration and settling in an EPT area 2C. Here primary treated effluent B flows to a solids contact aeration tank 34 if the final solids separation process is sedimentation as in FIG. 5. However, if the final solids separation uses membranes as in FIGS. 6 and 7, then the primary treated effluent passes through a fine screen 35, such as a 1 mm or 3 mm perforated fine screen, to protect the downstream membranes and maximize the separation of organic solids. The fine screen 35 can be placed before the solids contact aeration tank 34 or after the primary clarifier 33. Fine screen effluent AJ enters the solids contact aeration tank 34, which has an HRT of less than one hour and an SRT of less than one half day. In this tank, air Y is introduced through fine bubble diffusers to promote bio-flocculation of suspended solids with high-yield aerobic heterotrophic bacteria that produce exo-cellular polymers. The exo-cellular polymers promote flocculation and attachment of suspended and colloidal organic matter to flocs for removal by adsorption. Contact aerated mixed liquor AK goes to a primary clarifier 33. A portion of the settled or filtered solids AL returns to the solids contact tank 34 to maintain its solids inventory and SRT, and another portion equivalent to the total suspended solids net increase is wasted. This extent of aeration preferably maximizes the removal of BOD and suspended solids without oxidizing or aerobically stabilizing the organic matter.

Primary treatment in FIGS. 6 to 8 achieves a minimum of 50%, preferably 60%, BOD removal and over 70% TSS removal. The solids concentration of the primary sludge E may range from 0.5 to 6% DS depending on the precise removal method. The enhanced primary treatment configuration choice depends on the relative cost of implementation and operation, which is site specific and may be a function of existing infrastructure if it is a retrofit to an existing treatment plant or a new facility, the cost of chemicals, etc.

There are two modes of secondary treatment used in FIGS. 6 to 8, Mode A with biological nitrogen removal and chemical phosphorous removal and Mode B with biological nitrogen removal and biological or biological and chemical phosphorous removal. Both modes can operate with membranes or secondary clarifiers as the final solids separation step in the secondary treatment.

In general, when chemically enhanced primary treatment is applied through EPT areas 2A or 2B, 60 to 80% of the phosphorous is removed chemically with the primary sludge E. This is the case shown in FIGS. 5 and 6. In EPT area 2C, when no chemicals are added, less than 30% of the phosphorous is removed with primary sludge E. Further chemical phosphorous removal downstream of any of these EPT areas 2 can be done by adding a second dose of metal salts before a final solids separation step such as a clarifier (FIG. 5) or a membrane tank (FIG. 6). Alternatively, further phosphorous removal can be accomplished biologically by uptake (FIG. 7).

In FIG. 5, Mode A is combined with a secondary clarifier 23 to produce a secondary treatment area 3D. Some or all of the reactors or zones in the biological treatment train can be part of a common non-covered plug flow biological treatment tank with baffles used to separate the zones. Primary effluent C goes to an anoxic denitrification reactor 36. The HRT of the anoxic reactor 36 ranges from 0.5 to 2 hours. The anoxic reactor 36 can be mixed with top entry or submersible mixers. In the anoxic reactor 36, heterotrophic denitrifiying bacteria reduce (to nitrogen gas) nitrate returned with activated sludge AM from a polishing aerobic zone 37 and a return mixed liquor W from the secondary clarifier 23.

De-nitrified anoxic mixed liquor AN flows to a single-stage integrated fixed film activated sludge (IFAS) reactor 38. Here, anaerobic ammonia oxidizing (anammox) bacteria grow attached to neutrally buoyant plastic media 30 that provide an inert surface for biofilm attachment. The anammox bacteria have the lowest doubling time and overall solids yield of all the bacteria involved in the biological treatment process. Therefore it is important to retain the anammox bacteria in the de-ammonification reactor 38 to provide adequate solids retention time. This is accomplished by growing the bacteria attached to the inert media 30 surface and retaining the media 30 with screens 39.

Attached ammonia oxidizing bacteria (AOB) also grow on the outer layers of the biofilm. Additionally, dispersed AOB grow suspended in the IFAS reactor 38. Heterotrophic denitrification bacteria, and autotrophic nitrite oxidizing bacteria, are added to the IFAS reactor 38 with a recycle stream and coexist with the other microorganisms in suspension. Mixed liquor in the biological nutrient removal system contains dispersed anammox and ammonia oxidizing bacteria (AOB), nitrite oxidizing bacteria (NOB), heterotrophic nitrate reducing bacteria or denitrifiers, and heterotrophic carbon oxidizing bacteria. The relative abundance and activity of the various types of bacteria in this consortium depend on the conditions created in each of the zones or reactors, on the substrates they receive and on the internal recirculation streams.

In the de-ammonification (IFAS) reactor 38, conditions are maintained mostly to provide partial ammonia oxidation to nitrite conversion by AOBs and nitrite and ammonia de-ammonification to nitrogen gas by anammox bacteria. The dissolved oxygen (DO) is maintained at 0.2 to 0.4 mg/L to select against nitrite oxidizing bacteria (NOB), which require higher DO levels. The AOB consume DO and create low oxygen conditions for the deeper layer of the attached biofilm which is populated by anammox bacteria. The hydraulic retention time is 2 to 4 hours and the mixed liquor suspended solids concentration (MLSS) is 5 to 10 g/L. The SRT is 5 to 12 days depending on temperature and other variables. In the IFAS reactor 38, approximately one half of the ammonia is oxidized aerobically to nitrite. For optimum ammonia removal, anammox bacteria require nitrite-N to ammonia-N ratios in the range of 1.1 to 1.4. Anammox bacteria use the nitrite as an electron acceptor to anaerobically convert the remaining ammonia to nitrogen gas. Therefore the anaerobic oxidation of ammonia does not require carbon as an electron donor. The alkalinity consumption is low, in the order of 1.2 kg alk as CaCO3/kg N removed, compared to approximately 3 kg/kg N in a conventional nitrification/denitrification (N/dN) process. The available alkalinity to nitrogen ratio in primary effluent C is sufficient for de-ammonification and no alkalinity supplementation is required. Regarding oxygen requirements, the de-ammonification process uses 1.9 kg O2/kg N removed compared to 4.3 kg O2/kg N used in a conventional N/dN process.

The IFAS reactor 38 has two options for aeration and mixing. Option 1 is to use intermittent coarse bubble aeration to mix the moving bed carrier media 30, supply the oxygen required to oxidize a portion of the ammonia to nitrite, and maintain the indicated low DO levels. Air supply Y may be off for 20 to 30 minutes and on for approximately 10 minutes. The frequency and duration of the intermittent aeration cycle may be varied depending on the nitrogen concentration, biomass inventory and diffuser oxygen transfer efficiency. While air Y is off, a mechanical mixer operates in the IFAS reactor 38. Option 2 is to use continuous modulated aeration controlled by signals from in line analyzers for ammonia and nitrate. When ammonia content increases, air flow is increased. When nitrate content increases, air flow is reduced. With this aeration control strategy, mechanical mixing is not required.

The de-ammonification process produces 0.2 to 0.3 mg of nitrate-N per mg of nitrogen removed. Typically the reactor will have 6 to 10 mg/L of nitrate-N left after de-ammonification. The ammonia removal efficiency in the IFAS reactor 38 is 90 to 95%. There will typically remain 1 to 3 mg/L ammonia-N in the de-ammonified mixed liquor AO. Usually nitrite removal is over 95% in the IFAS reactor 38. Depending on the nitrogen content of the wastewater, 1 to 2 mg/L of nitrite-N can be expected in the de-ammonified liquor AO.

De-ammonified mixed liquor goes AO to an aerobic suspended growth polishing reactor 37 without submerged membranes. The HRT in this reactor ranges from 1 to 2 hours. In the polishing reactor 37, fine bubble aeration supplies the oxygen needed to nitrify the ammonia and the nitrite that escaped the de-ammonification reactor 38. Depending on the final effluent D total nitrogen concentration required, more or less nitrate is returned in sludge AM to the anoxic reactor 36. The higher the return rate, the lower the total nitrogen in the effluent. Typically 1 to 3 times the average flow rate is returned. Nitrified mixed liquor AP flows out of the polishing reactor 37 to a secondary clarifier 23. Internal return of nitrified mixed liquor from the polishing reactor 37 to the anoxic reactor 36 reduces solids and hydraulic loading on the secondary clarifier 23. The typical return flow of return mixed liquor W is 0.5 to 1 times the average plant flow. If further chemical phosphorous removal is required, a metal salt coagulant S can be added before the secondary clarifier 23. The phosphorus will react with ferric iron to produce ferric phosphate that precipitates and is removed with the secondary sludge F.

Solids produced in the biological treatment process and non-degraded solids that entered with primary effluent C settle in the secondary clarifier 23 and are contained in secondary sludge F. Secondary sludge F contains a combination of sloughed-off anammox bacteria, AOB, NOB, and heterotrophic denitrifiers. The majority of the secondary sludge F is returned to the anoxic reactor 36 as return mixed liquor W. A small portion of secondary sludge F in stream AQ goes to a sludge thickener 22. The thickener 22 can be a drum, screw, centrifuge, or belt type. With the use of polymer, waste secondary sludge F combined with primary sludge E are thickened to 6 to 12% DS in the thickener 22. Thickened combined sludge AR is directed to a high solids anaerobic digestion area 4B. The thickener filtrate AE goes to the front of the primary treatment area 2B. The secondary treatment configuration showed in FIG. 5 may be retrofit in existing conventional activated sludge plants since all of the process modifications can be implemented in existing activated sludge tanks, while the primary and secondary clarifiers remain unchanged.

FIG. 6 uses a secondary treatment area 3E using Mode A with submerged membranes. The process operates essentially in the same manner described above for the secondary treatment area 3D. However, instead of the aerobic polishing reactor 37 and secondary clarifier 23 shown in FIG. 5, the process in FIG. 6 uses a submerged membrane tank 20 to separate the solids after biological treatment. The air Y used for membrane scour is also used as a source of oxygen to nitrify the ammonia and nitrite that bleed from the IFAS reactor 38. De-ammonified mixed liquor AO enters the membrane tank 20. The membrane tank 20 may contain submerged microfiltration or ultrafiltration flat sheet or hollow fiber membranes. The scouring air Y supply is controlled such that the air requirement for scouring introduces a slightly higher amount of oxygen than what is required to meet the oxygen demand of biological polishing and cell maintenance, and maintains the DO at a maximum of 2 to 3 mg/L.

The MLSS in the membrane tank 20 ranges from 7 to 14 g/L. The MLSS content in the membrane tank 20 increases as liquid is filtered by the membranes to produce final effluent D. To avoid mixed liquor over-thickening, which would reduce membrane flux rate, return mixed liquor W is returned to the front of the anoxic reactor 36. The return mixed liquor W returns nitrate to the anoxic reactor 36 for denitrification. The liquor return rate is 3 to 4 times the forward flow or effluent flow (3 to 4 Q).

It is preferable to avoid high DO concentration in the membrane tank 20 by using membranes that require low scour air flows and can operate with intermittent aeration. The return mixed liquor W also carries dissolved oxygen. Mixed liquor with a high DO content will introduce dissolved oxygen into the anoxic reactor 36. This will limit the denitrification efficiency and will consume soluble BOD on heterotrophic oxidation and not on denitrification. Maintaining low DO in the membrane tank 20 improves denitrification and reduces the volume in the anoxic reactor 36, as less oxygen is returned with the return mixed liquor W.

With a 4 Q sludge return rate, the final effluent D could have as low as 2 mg/L of nitrate-N, less than 0.5 mg/L of ammonia-N, and less than 0.5 mg/L nitrite-N. Assuming that there is 2 mg/L of non-degradable soluble organic carbon in the wastewater, this process can produce effluents with less than 5 mg/L total nitrogen, less than 1 mg/L TSS, and less than 5 mg/L BOD. The final effluent E goes to disinfection and discharge or to storage and reuse. This low total nitrogen effluent concentration, achieved with low energy anammox treatment and enhanced primary treatment, is made possible by combining fixed and suspended biomass and a polishing aerobic membrane reactor 20 with adequate mixed liquor return, and an anoxic denitrifying reactor upstream of the IFAS reactor 38 to make use of soluble BOD in the primary effluent C. If low phosphorus limits must be met, an iron or aluminum salt coagulant S can be added prior to the membrane tank 20.

Submerged membranes allow essentially complete control of the SRT as essentially no suspended solids leave with the final effluent D. Therefore, excess solids must be wasted to avoid accumulation of inert particles and non-degradable solids that entered with the primary effluent C, as well as an accumulation of biological solids produced in the treatment process. A portion of the secondary sludge F is wasted to a sludge thickener 22, where it is co-thickened with primary sludge E.

FIG. 7 uses Mode B with submerged membranes and adds and an anaerobic zone for biological phosphorous removal to form a secondary treatment area 3F. Primary effluent C enters a mechanically mixed anaerobic zone 40 that selects for growth of phosphate accumulating organisms (PAO) or poly-P bacteria. These organisms uptake volatile fatty acids (VFAs) and release phosphorous in the anaerobic zone. In wastewater with short retention time in the collection system, the VFA content is low and the VFAs contained in primary effluent may not be sufficient to promote significant presence of PAOs and P removal, therefore a VFA supplemental source may be required. As will be described described below, VFAs are produced by hydrolysis of primary sludge E and fine screenings AS in a separate reactor 41. After thickening the hydrolyzed sludge AT, a filtrate AU rich in VFAs is fed to the anaerobic zone 40 to enhance PAO growth and P removal. A portion of the filtrate AU can also be fed to the anoxic reactor 36 as needed to provide a carbon source for denitrification.

In the anaerobic zone 40 mixing is done with submersible or top-entry mixers. The HRT in the anaerobic zone 40 ranges from 1 to 2.5 hours, and SRT ranges from 6 to 15 days depending on the temperature. The sludge train operates at a mixed liquor suspended solids (MLSS) ranging from 5 to 10 g/L. To maintain an adequate concentration of phosphate accumulating bacteria (PAO) in the anaerobic zone 40, sludge must be recycled. It is important to maintain low nitrate and nitrite concentration in the anaerobic zone 40 to ensure it remains anaerobic and with low ORP to maximize P removal. For this, mixed liquor AV is returned from the end of the anoxic denitrification reactor 26 to the front of the anaerobic reactor 40. The sludge return rate ranges from 50 to 100% of the forward flow.

Anaerobic mixed liquor AW flows to an anoxic denitrification reactor 36. A carbon source is required as an electron donor for denitrification to occur. It is likely that the PAOs in the anaerobic reactor 40 will uptake all the readily degradable BOD in the primary effluent and not much BOD will be left in the anoxic reactor 36 for denitrification. Therefore, a portion of the VFA-rich filtrate AU from the hydrolyzed primary sludge thickener 22 is directed to the front of the denitrification reactor, as needed to allow complete denitrification.

The de-nitrified anoxic mixed liquor AN flows to a de-ammonification reactor 38 and from there to a polishing submerged membrane reactor 20. With the higher DO content and ORP in this reactor, the PAOs will uptake most of the soluble phosphate in the mixed liquor and will release the majority of the VFAs uptaken in the anaerobic reactor 40. These VFAs contribute BOD to the effluent and therefore need to be oxidized. Aerobic heterotrophic bacteria will oxidize the released BOD in this reactor. A small amount of nitrate returns to the anoxic reactor 36 in the return mixed liquor W from the polishing membrane reactor 20. This nitrate is removed in reactor 36 using as carbon source the filtrate AU from the primary sludge thickener 22. Filtrate AE from A secondary waste sludge thickener 22 goes to the front of the primary treatment area 2C, along a filtrate AX from digested sludge dewaterer 27.

As the oxygen content and oxidation-reduction potential (ORP) of the mixed liquor increase along the biological treatment train, excess phosphorous is uptaken and stored by the PAOs, which in turn release VFAs. Phosphorous accumulated in the PAOs is sent with the wasted organisms to anaerobic digestion. The filtrate AX from digestate dewaterer 27 contains phosphorous that is released by the wasted PAOs during digestion and becomes solubilized in the liquid fraction of the digestate AH. A phosphate recovery unit 42 can be used to recover the phosphate as struvite AY and produce filtrate AX with low phosphorous that returns to the front of the primary treatment area 2.

The range of PAO concentration as a function of the overall mixed liquor volatile suspended solids (MLVSS) is 3 to 10%. Depending on the characteristics of the wastewater, final effluent D phosphorous concentration can be as low as 1 mg/L for raw wastewater containing 7 to 8 mg/L.

In cases where phosphorous limits are lower, biological phosphorous removal can be combined with chemical P removal. For this, aluminum or iron salt coagulant S can be added in two locations in the biological treatment system. It is effective to add metal salts at the end of the anaerobic zone 40, where the PAOs release phosphate. The abundance of dissolved phosphate in the anaerobic mixed liquor results in lower aluminum- or iron-to-phosphorous ratio, and therefore is cost effective compared to only adding metal salts in the polishing membrane reactor 20, which contains the least amount of soluble phosphate, and there is more competition with other constituents in the water to react with the iron or aluminum salt. The strategy of two-point chemical addition combined with biological removal in the membrane reactor 20 can reach effluent P concentrations lower than 0.5 mg/L.

Primary sludge hydrolysis occurs in a primary sludge acidification tank 41. Introduction of VFAs is necessary to reach low effluent phosphorous concentrations. Effluent from an enhanced primary treatment system does not contain sufficient VFAs for substantial biological phosphorous removal. Therefore, it is supplemented with VFAs produced by hydrolysis of primary solids. Fine screenings AS are commingled with primary sludge E into a dedicated completely mixed sludge hydrolysis reactor 41. This reactor has 5 to 10 hours of HRT and is heated to 25 to 30 degrees C. The solids content in the reactor 41 ranges from 2 to 4% DS. The reactor 41 produces volatile fatty acids (VFA) from initial fermentation of the primary solids. The yield ranges from 100 to 400 mg VFA as COD per g VSS fed to the hydrolysis reactor 41. The VFAs are dissolved in the liquid fraction. VFAs are necessary for phosphate accumulating organisms (PAO) to remove phosphorous in a down-stream secondary process.

The sludge hydrolysis reactor 41 is a mechanically mixed tank with a cover for odor control and retaining heat introduced to the tank. Heat is recovered form a combined heat and power generation system using as fuel the biogas J the anaerobic digestion area 4 produces. The hydrolyzed primary sludge AT goes to a sludge thickener 22 that can be of the table belt, drum, disc or flocculating screw type. The thickener filtrate AU contains VFAs and is fed to the anaerobic zone 40 of the biological nutrient removal system to enhance VFA uptake and phosphorous release by PAOs. PAOs will accumulate phosphorous in the anoxic and aerobic zones of the nutrient removal system. Thickened sludge AY from thickener 22 is fed at 6 to 12% DS to the anaerobic digestion area 4. The filtrate AE from the secondary waste sludge thickener 22 and the filtrate AX from digested sludge dewatering also return to the front of the primary treatment system area 2.

Regarding anaerobic digestion, the process flow sheets in FIGS. 5, 6 and 7 produce about 90% of the solids produced by a conventional N/dN plant. This is about 220 kg of primary and secondary solids combined per 1,000 $m^3$ of sewage treated. Of this, 180 kg is primary solids and 40 kg is secondary solids. This is on average 20% more primary solids than a plant with conventional primary sedimentation and about 55% less secondary solids than a conventional N/dN plant. The higher proportion of primary solids is the result of removing a larger fraction of the solids present in the sewage than with conventional primary sedimentation. The smaller production of secondary solids is the result of employing a biological nutrient removal system that minimizes solids yield. Primary solids are easier to digest than secondary solids (bacterial sludge), and they produce more methane per unit mass of volatile solids destroyed. As a result, proper digestion of the sludge mixture results in higher biogas production and less digested sludge cake than what is obtained digesting primary and secondary sludge resulting from a conventional N/dN processes.

As shown in FIG. 7, thickened primary solids AY and thickened secondary solids AZ are pumped to the anaerobic digestion area 4. In FIGS. 5 and 6, combined primary and secondary thickened solids exit the sludge thickener 22 and are fed to the anaerobic digester area 4. Referring to FIG. 5, an anaerobic digester area 4B has a digester 25. Digestate AH goes to a dewatering unit 27 that can be a flocculating screw press, belt press or centrifuge. Polymer may be added to help dewater the digestate. The cake H at 20 to 25% DS, depending on the dewatering equipment, goes to drying/pelletizing, composting or disposal. The liquid fraction AX may go to an optional stage of struvite recovery and from there to the front of the primary treatment system. Recovered struvite AY may be sold as fertilizer pellets.

Anaerobic digestion area 4B has two alternatives: single stage medium solids; and two-stage high-solids. Single stage medium solids digestion is used when the combination of thickened primary and secondary solids reaches a maximum of 10% DS by dewatering with polymer addition. This sludge mixture can be digested in single stage digesters mixed using electric or hydraulic submersible mixers accessible through service boxes mounted on the digester cover. The mixers and service boxes are such as produced by UTS Products GmbH. The single stage digesters are typically designed with 20 days HRT. After volatile solids destruction they operate at approximately 4 to 6% DS. The solids loading rate is 3 to 4 kg VS/$m^3$-day.

In contrast, standard-rate mesophilic anaerobic digesters in wastewater treatment plants are typically fed thickened sludge at less than 5% DS, and after volatile solids destruction, digesters typically operate at less than 3% DS. They operate at 25 days HRT and a solids loading rate of 1.6 kg VS/m³-day. Municipal digesters with 3% DS are usually mixed with gas mixers, top entry mixers or jet mixers with external recirculation pumps. These type of mixers are not suitable for solids contents higher than 4 or 5% DS.

The medium-solids operation has the advantage of extending the HRT and SRT in existing digesters as less water is introduced. Another advantage compared to conventional low-solids digesters is that with 5% DS digestate in the digester there is a higher inventory of active anaerobic bacteria than in conventional 2 or 3% DS digestate. If a low-solids and a medium solids digester of equal volume are fed the same mass of VS each day, there is approximately 60% more active anaerobic bacteria in the medium-solids digester content than in the low-solids digester. Since there are more bacteria available to decompose the same amount of volatile solids fed, the specific loading rate or anaerobic food-to-microorganism ratio (an F/M) is lower and as a result the degree of destruction of the feed VS is higher, and the gas production per kg of VS fed is higher. This is accomplished without increasing the digester volume to extend the retention time. Lowering the F/M ratio allows introducing other high-strength waste streams high in COD and solids for co-digestion to increase gas production, with less risk of upsetting the digester performance by overload. Conventional low solids digesters typically operate at a tenuous balance and only small amounts of VS can be added before the digesters experience process upsets. The tendency of conventional digesters to upset is also evident when the supply of external high strength waste fluctuates or substrates change.

Two stage high-solids digestion is used for co-digestion of thickened sludge and high-solids external waste, where the combined feedstock is 14 to 16%. If the digesters are fed 14% DS feedstock it is necessary to use two-stage digestion. When operating with municipal sludge only, the practical limit is 14%, as above this solids content the high concentration of ammonia in the digestate will cause inhibition of methanogenic bacteria. The circular digester tanks are mixed with low speed, high torque submersible hydraulic motor driven mixers. Access to the mixers for service and positioning is done through service boxes mounted above each mixer on the digester cover. Mixers and service boxes are such as produced by UTS Products GmbH, which are suitable to mix sludge with high solids content. The mixing is done intermittently, typically 10 to 20 minutes every hour.

In two-stage digesters, the first stage is a circular tank with 35 to 40% of the volume of the second stage circular tank. The overall retention time for the system is 20 days. The first stage has 8 days and the second stage 12 days. The first stage tank diameter must be less than 24 meters and the side water depth 8 meters or less, to enable proper mixing. Partially digested sludge from the first stage at approximately 10% DS is transferred to the second stage. In the second stage digester VS destruction continues and the solids content is further reduced to approximately 7 or 8% DS. The diameter of the second stage digester must be less than 35 meters and the side water depth 8 meters or less to enable proper mixing. Digester gas is collected from the service boxes of the two digesters. Overall solids loading rate is 5 to 6 kg VS/m³-d, however, due to the higher concentration of active biomass remaining in the digestate, the specific loading rate or F/M ratio is less than 0.1 kg VS per day per kg VS under digestion, lower than conventional standard-rate digesters. In practice, while the volumetric loading rate is three fold, the specific loading rate is lower. If this concept is compared with a typical WWTP where digesters are designed for 25 days HRT based on feeding 5% DS sludge, the digester volume required would be about one third, to process the same amount of solids. The objective is not to reduce tank volume but to offer more complete digestion to increase biogas production for heat and power generation.

The ammonia concentration in the digestate is important, as ammonia has an inhibitory effect on methanogenic bacteria. When operating at higher solids the ammonia concentration in the digestate increases. Primary sludge has lower content of nitrogen than secondary biological solids. In primary solids typically 2.5% of the DS is nitrogen and in secondary solids typically 3.7% of the DS is nitrogen. In the flow sheets presented in FIGS. 2, 3 and 4 only 20% of the sludge produced is secondary solids, compared to 36% in conventional N/dN. This allows operating the digesters at higher solids content while maintaining a lower ammonia concentration. The ammonia-N content in an 8% DS digestate is 4,500 to 4,800 mg/L and at this concentration there is no inhibition in mesophilic digesters.

Compared to conventional activated sludge municipal wastewater treatment the use of the flow sheets presented in FIGS. 5, 6 and 7 result in a 20 percent reduction in green house gas (GHG) emissions without considering the GHG reduction associated with the lower energy consumption. The average plant-wide energy savings is about 45 percent. About half of the GHG emitted by a conventional activated sludge WWTP is associated with power use. Therefore a 45 percent reduction in power use would result in an additional 22 percent reduction in GHG emissions associated with reduced energy use. Overall GHG emission reductions are achieved in four ways, a) reducing carbon dioxide and nitrous oxide direct emissions from activated sludge tanks, b) eliminating consumption of methanol or other external carbon sources for denitrification, c) reducing the electrical energy required for aerobic oxidation of organic matter, suspended solids, and nitrogen, and d) maximizing capture of solids in sewage for efficient high-solids anaerobic digestion, which produces renewable biogas for heat and energy generation instead of carbon dioxide and biomass in a conventional aerobic activated sludge system.

In FIG. 8, an anaerobic digester is followed by a downstream mixed liquor concentrator, which is in turn followed by a membrane filtration unit. Thickened sludge from the concentrator and mixed liquor from the membrane filtration unit are both returned to the anaerobic digester. The concentrator allows a high solids concentration to be maintained in the anaerobic reactor while allowing the membrane filtration unit to receive a lower solids mixed liquor. By reducing the solids concentration in the mixed liquor, the concentrator allows the membrane filtration unit to operate at an increased flux or with reduced gas scrubbing. By removing or reducing a need for the anaerobic digester to retain solids itself, the concentrator also allows for a robust form of reactor such as a continuously stirred tanks reactor (CSTR) to be used as the anaerobic digester. The solids returned to the anaerobic digester from the concentrator and membrane filtration unit maintain a very high solids retention time (SRT) in the anaerobic digester, sufficient to produce a stabilized sludge despite the low temperature of the wastewater.

Also in FIG. 8, an anaerobic digester is coupled to an air scrubbed membrane filtration unit, with a recycle of mixed liquor from the membrane filtration unit to the anaerobic digester. The amount of oxygen transferred to the mixed liquor by the air does not prevent the operation of the anaerobic digester. Optionally, the oxygen is used to produce nitrite in the mixed liquor which, after denitritation in the digester or an optional anoxic zone, reduces the total nitrogen concentration in permeate from the membrane filtration unit.

Also in FIG. 8, anaerobic digestion is combined with nitritation and membrane filtration. Nitritated mixed liquor is returned to the anaerobic digester for denitritation to remove nitrogen from the wastewater. Optionally, nitritation and denitritation are also performed in a mixed liquor de/nitritation loop within a larger mixed liquor recycle loop between the anaerobic digester and the membrane filtration unit. The de/nitritation loop may have an anoxic tank or an aerobic tank or both. Optionally, plant effluent may be ozonated to oxidize residual nitrite to nitrate. Optionally, carbon from screenings or waste sludge may be added to the de/nitritation loop to enhance nitrogen removal. The specification further provides a process and apparatus whereby screenings or waste sludge may be processed to produce a liquid with a high soluble carbon content that can be returned to the anaerobic digester or to a denitritation zone.

FIG. 8 shows a plant 100. The plant 100 may be used to treat a variety of feed liquids, but will be described below as used to treat a raw influent A containing low strength (ie. <1000 mg COD/L) wastewater such as municipal wastewater or sewage. The raw influent A may have a temperature of 20 degrees C. or less at all times, or at least seasonally. The plant 100 was designed assuming a 1 million gallon per day (MGD) flow of municipal sewage with 500 mg/L of chemical oxygen demand (COD) and 200 mg/L of total suspended solids (TSS).

In the primary process stream of the plant 100, raw sewage A flows into an anaerobic reactor 3. The anaerobic reactor 3 may sometimes be referred to as a digester herein. The reactor 3 contains microorganisms, primarily bacteria, to digest the influent A. The microorganisms convert suspended solids and dissolved organic matter (primarily proteins, carbohydrates and fats) in the influent A into a biogas AA that is collected and removed from the digester 3. An anaerobic mixed liquor F flows from the digester 3 to a concentrator 4. The concentrator 4 divides the anaerobic mixed liquor F into a) a thickened anaerobic mixed liquor S that is returned to the digester 3, b) a waste anaerobic sludge BB and c) a thinned mixed liquor G. Thinned mixed liquor G flows to a membrane separation unit 7. The membrane separation unit 7 extracts membrane permeate J from the thinned mixed liquor G while mixed liquor return U is returned to the digester 3. Membrane permeate J is the start of an effluent stream from the plant 100. Thickened anaerobic mixed liquor S and mixed liquor return U from the membrane unit 7 retain biomass in the digester 3 and so permit a solids retention time (SRT) in the digester 3 many times greater than the hydraulic retention time (HRT) of the digester 3.

De-gritted sewage C flows to a fine screen 2. The fine screen 2 removes solids larger than a screening aperture, for example 2 mm. The fine screen 2 is preferably a perforated plate screen such as a drum or band screen, rather than a slotted screen or wedge wire, to remove more fibers and hair. Fibers and large solids interfere with membrane operation and can damage membranes. Fine screening with a perforated screen is particularly desirable if the membrane filtration unit 7 uses hollow fiber membranes.

Fine screenings E rejected by the screen 2 may be sent to an aerobic or anaerobic solids digester of the types normally used in wastewater treatment plants to digest waste solids or sludge. However, removing the fine screenings E may reduce the total suspended solids (TSS) of the raw sewage A by about 30%. The TSS may make up about 50% of the COD of the raw sewage A. Removing the fine screenings E may therefore reduce the COD of the raw sewage A, and biogas AA production, by about 15%. To avoid the loss of COD, the fine screen 2 can be moved to a position downstream of the anaerobic reactor 3 but upstream of the membrane filtration unit 7 and the fine screenings E can be returned to the anaerobic reactor 3.

Alternatively, as in the plant 100, the fine screenings E may be processed to recover some of the COD for use in optional nitrogen removal steps (to be described below) or to be returned to the anaerobic reactor 3, or both. For COD recovery, the fine screenings E, and optionally the waste anaerobic sludge BB, may be sent to a solids chemical treatment unit 9. This unit process uses a caustic, such as sodium hydroxide, and heat to break chemical bonds in particulate and soluble organic compounds in the fine screenings E and waste anaerobic sludge BB, and to lyse undigested bacteria cells. For example, the fine screenings E and waste sludge BB may be blended with liquid sodium hydroxide and retained over a period of 1 to 3 hours in a double hollow screw heat exchanger at a temperature between 60 and 80 degrees C. Hot water recirculates inside the screws and the housing jacket of the hollow double screw heat exchanger. The alkali reaction is thus accelerated with heat. Heat for this process may be obtained from waste heat of a power generation unit or a boiler operating with biogas AA produced in the anaerobic reactor 3. Other configurations for the solid chemical treatment unit 9 may also be used to provide caustic and heat treatment processes. For example, insulated tanks with mixers can be used for chemical reactors with tube-in-tube heat exchangers to supply the heat treatment.

In the solids chemical treatment unit 9, strong chemical bonds in complex organic compounds are cleaved by the alkali to render simpler soluble or liquefied organic compounds. Undigested bacteria cells from the solids concentrator are lysed and the organic acids contained in the cells are released to the liquid. The chemical sludge treatment process thereby pasteurizes the sludge and converts the screenings and sludge into Class A biosolids by pathogen reduction. The chemical treatment process also reduces the amount of solids that exit the plant 100 after chemically treated sludge L leaving the solids treatment unit 9 is process further.

The chemically treated sludge L is processed in a sludge dewatering unit 14 to produce a cake CC. Any suitable device for removing liquid from sludge, with chemical treatment or not, may be used in the sludge dewatering unit 14. The cake CC is well stabilized and may be composted or further dried and made into pellets for use as a fuel or fertilizer. Cake CC is sent to cake storage 15 and later hauled from the plant 100.

A filtrate (or pressate or centrate) Q from the dewatering unit 14 returns to an optional anoxic tank 5 (to be described below) or to the anaerobic reactor 3 or both. Filtrate Q returning to the anaerobic reactor 3 may be introduced just upstream of the fine screen 2 so that the potential for solids larger than 2 mm reaching the membrane unit 7 is minimized. When the filtrate Q is returned to the anoxic tank 5, an inline strainer 10 may be used for the same purpose. The strainer 10 may be, for example, a self-cleaning perforated in-line strainer. Since sludge dewatering may be an intermittent process, the return filtrate Q may pass through a storage tank for equalization before being pumped through the strainer 10 or back to the screen 2.

The liquid filtrate Q contains soluble carbon, ammonia, organic nitrogen and phosphorous. The filtrate Q can be used in the anaerobic reactor 3 to increase methane production from the now digestible organic carbon. The filtrate Q can also be used in the anoxic zone 5, if any, as a carbon source for denitritation and denitrification as will be described further below. The returning filtrate Q contains high alkalinity as a result of the sodium hydroxide addition. The alkalinity is useful regardless of whether the filtrate Q returns to the anaerobic reactor 3 or the anoxic tank 5. A nitritation/denitritation process to remove nitrogen facilitated by the anoxic tank 5 results in a net alkalinity deficit. Low alkalinity can inhibit the nitritation process. The addition of alkalinity to the system enhances the stability of the nitrogen removal process.

Returning to the digester 3, the principal component of the digester 3 is typically one or more sealed tanks, in series or parallel or both, which receive the feed (screened sewage D) and mixed liquor recycle flows S, U and contains mixed liquor undergoing digestion by active bacteria. The digester 3 is typically operated continuously, but batch and semi-continuous operation are also possible. The digester 3 may comprise, for example, a sealed tank with an internal mechanical mixer operating as a continuously stirred-tank reactor (CSTR). A vertical component in the mixing may be used to reintroduce floating layers of grease and scum to enable their digestion and avoid crust layers. Mixing can be done with submersible mixers, jet mixing or recirculation pumping. A suitable digester 3 is available from UTS Biogastechnik GmbH as sold under the Helios trade-mark.

The anaerobic reactor 3 is used to digest organic matter contained in the wastewater and to reduce and stabilize solids for disposal. The digestion may include hydrolizing volatile solids, converting soluble organic compounds into volatile fatty acids, converting volatile fatty acids into acetate and producing biogas AA (primarily methane and carbon dioxide) from acetate and hydrogen. A long solids retention time (SRT) is required to hydrolyze most of the solids contained in fine-screened municipal sewage at low operating temperature. A target hydrolysis efficiency may be 75 to 80% removal of the volatile suspended solids in screened municipal sewage. This is required for good stabilization as about 50% of the COD in sewage is present as solids. The COD removal efficiency may be between 70 and 95% depending on the type of waste treated.

A CSTR is advantageous in the plant 100 because it is tolerant of high mixed liquor recycle rates and variability in the raw sewage A feed rate. However, in the plant 100 as a whole, the solids retention time (SRT) must be much higher than the hydraulic retention time (HRT). For example, at 20 degrees C., an SRT of 100 days or more is required to hydrolize suspended solids in the sewage. In a CSTR, the SRT and HRT are generally equal, and the effluent has the same solids concentration as the reactor. The downstream concentrator 4 is used to separate and return a significant amount of solids back to the digester 3. This provides a partial increase in the SRT and produces an effluent stream with reduced solids concentration to the membrane filtration unit 7. The membrane unit 7 provides a further increase in the SRT.

Other digester types include upflow anaerobic sludge blanket (UASB) with granular sludge and hybrid UASB, expanded granular sludge bed (EGSB), anaerobic sequencing batch reactors (AnSBR), fluidized bed (FB) reactors with inert carrier media, anaerobic filter (AF) and internal circulation reactors (IC), in single or multiple stages. These digester types can provide an SRT that is higher than the HRT and an effluent with reduced MLSS concentration without a concentrator 4 (although a concentrator 4 might still be used). However, it is not clear that any of them will operate with low strength wastewater. Further, their SRT is unlikely to be as high as 100 days or more and so a membrane filtration unit 7 is still required. Some of these digester types are not likely to operate reliably with the amount of mixed liquor return U from the membrane unit 7 that would be necessary to maintain a very high SRT. A UASB, for example, may have a maximum upflow velocity of 0.5 to 1.0 m/h, which would likely be exceeded if there were even a modest recirculation flow from the membrane unit 7 of about 2 times the raw sewage flow rate.

For these reasons, the plant 100 is described herein using a CSTR for the digester 3 followed by the mixed liquor concentrator 4. In combination, the digester 3 and mixed liquor concentrator 4 provide some increase in the SRT and an effluent flowing to the membrane unit 7 with reduce solids concentration, while being tolerant of large mixed liquor recirculation rates and variable raw sewage A feed flow rate.

The SRT when treating low strength municipal sewage may be 50 days or more, preferably 100 days or more. The SRT is controlled by the rate of removing waste anaerobic sludge BB. Longer SRTs are used for colder water and could be up to 150 days or 200 days or more. However, the reactor 3 preferably operates without heating for municipal sewage applications since a very large amount of energy would be required to heat large sewage flows.

The digester 3 may operate at a hydraulic retention time (HRT) in the range of 3 to 48 hours or 6 to 24 hours. Organic loading rates may be, for example, between 1 and 5 kg COD per cubic meter per day. F/M ratio may be about 0.1 kg COD per kg MLVSS per day. The anaerobic mixed liquor in the reactor 3 may have 3 to 5% solids content. The biomass yield may be between 4 and 10% depending on the type of waste.

Biogas AA evolves from the mixed liquor and is collected in a generally sealed headspace above the reactor 3. The biogas AA is removed, conditioned and burned to generate electricity or heat or is treated to produce biomethane (renewable natural gas) for injection into the natural gas distribution system. The biogas AA is primarily (about 70%) methane. In theory, about 0.35 g of methane are produced for every g of COD consumed in the digester 3, but actual production rates are likely to be about 75-85% of this amount. A raw sewage A flow of 1 MGD may produce enough biogas to produce about 100 kW of electrical energy.

Seed microorganisms may be initially carried into the digester 3 as a component of the raw sewage A. Optionally, to decrease start up time, the digester 3 may be seeded with sludge from an operating anaerobic digester such as a municipal anaerobic digester for primary sludge or waste activated sludge. It is preferable to have a large biomass inventory at start up. The digester 3 may be started at about one tenth of its design food to microorganism (F/M) ratio. The hydraulic and organic loading rates may then be increased slowly until the design F/M ratio is reached.

The anaerobic mixed liquor F leaving the reactor 3 flows into the mixed liquor concentrator 4. The concentrator 4 may use one or more processes, for example screening, filtration, settling, flotation or polymer addition, to produce a thickened anaerobic mixed liquor S that is returned to the digester 3. The concentrator 4 may also produce a foul air stream W. The foul air stream W may be sent to an odor control facility and discharges from the plant 100, or be returned to the digester 3 or mixed with biogas AA. The concentrator 4 also produces a thinned mixed liquor G. The thinned mixed liquor G preferably may have a total suspended solids (TSS) concentration of 2.5% or less. Since anaerobic sludge has a large percentage of very fine matter that tends to foul membranes, TSS concentration in the thinned mixed liquor is preferably 1.5% or less or 1% or less.

The concentrator 4 can be a gravity thickener with pickets to enable water to exit upwards from the compressed thickened sludge. The concentrator 4 can alternatively be a flotation device such as dissolved, induced or cavitation air flotation, or can be a mechanical thickening device such as a centrifuge, a screw thickener, drum thickener, or a screening device. The selection of the type of device depends on flow rates and solids concentration, which are also a function of the waste type. Polymers or other chemicals may optionally be added to improve solids separation. An example of a mixed liquor concentrator 4 designed for use with municipal sewage is shown in FIG. 2.

The mixed liquor concentrator 4 retains solids from the anaerobic mixed liquor F in the thickened mixed liquor S. The solids in the thickened mixed liquor S, which are mostly viable anaerobic biomass, are returned to the reactor 3. The concentrator 4 may thicken the anaerobic mixed liquor F to 5 to 8% solids content depending on the type of device used, how the device is operated and the polymer dose added, if any. The solids recovery in the concentrator 4 may range from 70% to 98%. Excess solids produced in the plant 100 may be wasted from the concentrator 4 through the waste anaerobic sludge BB. Compared to wasting solids from other points in the plant 100, wasting solids from the concentrator 4 allows better control of the process and also sends less water to the waste solids treatment unit 9 and dewatering unit 14.

The concentrator 4 processes a flow equal to the sum of all flows entering the reactor 3, which are the fine screened sewage D, a return mixed liquor U from the membrane unit 7, and return thickened anaerobic mixed liquor S from the concentrator 4. To avoid hydraulic and solids overload to the concentrator 4, and to avoid producing biogas AA with low methane content, the mixed liquor return U from the membrane unit 7 to the anaerobic rector may be limited to 4Q, where Q is the flow rate of the raw sewage A.

Thinned mixed liquor G, with reduced suspended solids concentration, proceeds to further treatment in a membrane separation unit 7. The membrane filtration unit 7 produces a mixed liquor return U with an elevated solids content and a permeate J with almost no solids content. The mixed liquor U is returned to the digester 3. An effluent liquid is removed through the membranes as permeate J. Permeate J contains low COD and virtually no TSS, and may also contain low phosphorous and low nitrogen. With optional nitrogen removal as will be described below, remaining nitrogen in permeate J may be present as nitrite, a small amount of nitrate and a very small amount of ammonia and non-degradable soluble organic nitrogen. Reducing the solids content of the mixed liquor G going to the membrane separation unit 7 in the concentrator 4 allows the membranes to operate at higher flux rates. This allows the use of less membrane area and, as a consequence, the use of less membrane scour air.

The membrane separation unit 7 may have a pore size in the ultrafiltration or microfiltration range or smaller. The membrane separation unit 7 may include one or more membrane modules which may be, for example, pressure fed cross flow filtration or dead end modules with tubular or hollow fiber membranes, or immersed suction driven modules of hollow fiber or flat sheet membranes. However, in the description to follow, the membrane modules are immersed suction driven modules that use gas sparging to inhibit fouling.

The membrane modules may be located above, or integrated with, one or more spargers that release bubbles into the modules. Pressurized gas is typically fed to the sparger from a blower. The blower may take biogas AA from the digester 3 or from another source of a gas containing little or no oxygen. In this case, membrane scrubbing gas can be collected at the top of the membrane filtration unit 7 after scrubbing the membranes and may be returned to the digester 3 or biogas AA stream, or sent to an odor control facility before being discharged from the plant 100. In this case, the membrane unit 7 is kept under anaerobic conditions and the anoxic tank 5, aerobic tank 6 and associated process streams would be deleted. The mixed liquor would then remain anaerobic throughout the plant 100.

Alternatively, air Z may be fed to the spargers and used to clean the membranes. Air collected at the top of the membrane filtration unit 7 after scrubbing the membranes is discharged to the atmosphere from the plant 100. If the scouring air results in an unacceptable dissolved oxygen content, the mixed liquor returning to the digester 3 from the membrane unit 7 may pass through a de-oxygenation tank or other unit process to remove oxygen. Although an additional de-oxygenating unit process may be required, biogas AA is not available during start up, and there may be an unreliable supply of biogas AA at various times during operation of the plant. Accordingly, designing for some oxygen addition through the scrubbing gas may be preferable to relying on biogas AA to provide scrubbing gas.

Further, air Z may be used to scrub the membranes because oxygen is desired to help remove nitrogen from the mixed liquor F. The incoming sewage A may have ammonia, organic nitrogen and phosphorous. The organic nitrogen is converted (mineralized) to ammonia in the reactor. The biomass uses only a small portion of the soluble nitrogen and phosphorous for growth. Accordingly, nitrogen and phosphorous are typically not removed in the digester 3 to an extent required to meet many discharge regulations when treating municipal sewage.

To remove nitrogen, ammonia is converted to nitrite or nitrate in, or in combination with, the membrane unit 7. The digester 3 receives a mixed liquor return flow U from the membrane unit 7. The mixed liquor return U to the reactor 3 carries the nitrite and nitrate to the digester 3. Denitrifying bacteria present in the anaerobic biomass in the digester 3 reduce nitrite and nitrate to nitrogen gas using soluble carbon available in the reactor as a carbon source (electron donor). The nitrogen gas exits into the headspace of the reactor 3 along with the biogas AA.

In the anaerobic reactor 3, denitrification is the preferred pathway for organic carbon consumption and occurs before methanogenesis. Therefore, the more nitrite and nitrate that are returned to the anaerobic reactor 3, the less methane is produced as the organic carbon is used for denitrification. To maintain methane production, the ammonia is oxidized primarily to nitrite rather than nitrate since 40% less carbon is needed for denitritation (from nitrite) than it is required for denitrification (from nitrate). Oxidizing ammonia to nitrite also requires 25% less oxygen than oxidizing to nitrate. Nitrosomonas, the bacteria responsible for ammonia oxidation to nitrite, remain viable through the anaerobic reactor 3.

Accordingly, air Z may be fed to the spargers for cleaning the membranes, and also used to assist in performing nitritation of the mixed liquor. The nitritated mixed liquor U is returned to the digester 3 for denitritation. Dissolved oxygen content in the mixed liquor in the membrane unit 7 is kept low enough, for example below below 1.0 mg/L, or at about 0.5 mg/L, to inhibit nitrification. However some nitrification may occur, and nitrate can be 10% to or 25% of the oxidized nitrogen.

Oxygen added to the mixed liquor thereby returns to the digester 3 primarily in the form of nitrite. This reduces the amount of biogas AA produced in the digester but also reduces the total nitrogen concentration of the membrane permeate J. Removing nitrogen within the plant 100 is desirable because the nitrogen concentration in the membrane permeate J would otherwise be in a range from about 20 to 60 mg/L. While this is too high a nitrogen concentration for discharge in many jurisdictions, it is also too low of a nitrogen concentration for practical nitrogen recovery processes. Further, there is almost no soluble biological oxygen demand (BOD) left in the membrane permeate J, and so polishing the membrane permeate J by a downstream nitrification and denitrification process would be inhibited by the lack of a carbon source for denitrification.

The proportion of mixed liquor U returned depends on the effluent total nitrogen limit that needs to be achieved. The return flow can be less than 1Q to 4Q, where Q is the raw sewage A flow rate. Mixed liquor recirculation U is also required because as mixed liquor moves along the membrane tank, it thickens as a result of water being removed from the system through the membranes. Depending on the membrane type, flux and cleaning protocols, it may be necessary to provide mixed liquor recirculation sufficient to avoid thickening the mixed liquor by more than 20 or 30%.

Optionally, an aerobic tank 6 may be added upstream of the membrane unit 7 to provide additional oxygen transfer for nitritation to the mixed liquor. Additional nitritation may be desirable to further decrease the total nitrogen concentration in the membrane permeate J to meet stringent discharge requirements. However, any additional air is preferably not sufficient to cause nitrification in the mixed liquor or to bring the dissolved oxygen concentration beyond the limits mentioned above. The aerobic zone or tank 6 may be desirable in a case of treating waste streams with high nitrogen content and low flow rates. In this case, if the membrane surface area is low for low flows and the ammonia content is high, the coarse bubble diffused air supplied in the membrane unit 7 for scour cleaning may not be sufficient to transfer the oxygen desired for nitritation to the mixed liquor. Fine bubble diffusers may be used in the aerobic tank 6 to increase the oxygen transfer efficiency. For municipal sewage with a typical nitrogen concentration in the 50 to 90 mg/L range, and with membranes operating at 12 to 14 gfd flux, the coarse bubble air supplied for membrane cleaning is likely to be sufficient for nitritation, such that the aerobic tank 6 is not required. The aerobic SRT (aerobic tank 6, if any, and membrane unit 7) may vary depending on sewage temperature. Typical ranges may be 4 to 10 days, with the longer SRT being required for colder temperature.

Further optionally, an anoxic tank 5 may be added upstream of the membrane unit 7. An internal nitritated mixed liquor return T is added between the membrane unit 7 and the anoxic tank 5. Internal mixed liquor return T brings nitrite and a small amount of nitrate to the anoxic zone 5 for denitritation or denitrification. Return filtrate Q, described above, is fed to the anoxic tank 5. Return filtrate Q contains carbon to support denitritation in the anoxic tank 5 beyond a limit that would otherwise be determined by the low BOD concentration of the anaerobic mixed liquor F.

The anoxic tank 5 is used to reduce nitrite and nitrate to nitrogen gas. The anoxic tank 5 may be mixed, for example by a submersible mixer or a jet mixing system. Mixed liquor in the anoxic tank 5 is a combination of heterotrophic denitrifying bacteria, hydrolyzing and acidogenic bacteria. The mixed liquor solids content may be between 4,000 and 20,000 mg/L, preferably less than 15,000 mg/L. The operational HRT may be between 30 minutes and 3 hours. The final effluent nitrogen content depends on the rate of internal recirculation of mixed liquor T and U to the anoxic zone 5 and to the anaerobic reactor 3. The higher the return rates, the lower the effluent total nitrogen. However the practical limit for the return to the anoxic zone 5 is the soluble carbon available as an electron donor for denitritation or denitrification. The main source of soluble carbon for the anoxic zone 5, beyond the small amount in the anaerobic mixed liquor F, is the return filtrate Q. Internal mixed liquor return flow T may range from 1Q to 6Q depending on nitrogen content in the raw sewage A and effluent nitrogen limits. In instances where the COD to TKN ratio in the raw sewage A is very high and the waste has a low TSS content that could be removed in the fine screen, a small portion of the fine-screened sewage D can be by-passed around the anaerobic reactor 3 and into the anoxic zone G to serve as a further carbon source for denitritation and denitrification. Alkalinity lost during ammonia oxidation is partially recovered in the anoxic zone 5 by way of the return filtrate Q. The anoxic tank or zone 5 is particularly useful when the effluent nitrogen limits from treating sewage are lower than 10 mg/L, or when treating wastewater with a high nitrogen content.

The plant 100 may also include means for removing phosphorous when required by discharge limits, or for recovering phosphorous as a resource. As an example, phosphorous may be removed by adding chemicals HH, for example iron or aluminum salts such as ferric chloride, or alum or polyaluminum chloride, to the anoxic zone 5. The iron or aluminum react with the otho-phosphate to create a stable phosphate precipitate. The anoxic zone 5 has the largest amount of soluble phosphorous released from the biomass, but if there is no anoxic zone 5 the chemicals HH may be added in another location upstream of the membrane unit 7. The membrane unit 7 retains the precipitate, which is transferred to the anaerobic reactor 3 with the return mixed liquor U. The precipitates do not decompose or solubilize in the reactor 3 and are removed through the waste sludge BB in the cake CC. The aluminum or iron dose depends on the phosphorous content of the raw sewage A and the specific effluent phosphorous limits. In this example the phosphorous is not recovered for beneficial use unless the cake CC is applied to agricultural land.

Phosphorous, and some nitrogen, may also be removed and recovered as a slow release fertilizer pellet. In this case, the phosphorous is precipitated as magnesium-ammonium-phosphate (MAP) or struvite in a chemical reactor 19 to produce MAP pellets. This precipitate is recovered from the filtrate Q returning from the dewatering unit 14 to the digester 3 or anoxic tank 5. An advantage of using this liquid stream for phosphate recovery is that it contains high ammonia and phosphorous concentrations, and has a high pH as a result of the caustic treatment in the solids chemical treatment unit 9. With the addition of a magnesium salt, MAP is precipitated and recovered, for example through a cyclone, as a slow release fertilizer pellet. The nutrient loading to the main liquid treatment train is also reduced.

Alternatively, membrane permeate J may be treated to remove or recover phosphorous if not removed previously. The membrane permeate J may also be treated to increase dissolved oxygen content prior to discharge, to disinfect, or as otherwise required to meet discharge requirements relating to the plant 100.

If nitrite has been intentionally produced in the plant 100 as a means to reduce total nitrogen, then a small but undesirable concentration of nitrite is likely to be present in the permeate J. Nitrite, when regulated, may have lower discharge limits than for nitrate. Ozone may be applied to the membrane permeate J to oxidize the nitrite to nitrate, disinfect the permeate J, re-oxygenate the permeate J and destroy endocrine disruptors and other trace emerging pollutants of concern in municipal sewage. Ozone is a potent oxidant and forms hydroxyl ions in water. An ozone generator 16 is used to supply ozone to an ozone contactor 17 that receives the permeate J before the discharge of disinfected final effluent FF. The ozone may be transferred to the permeate J using micro-pore diffusers in a contactor 17, such as a deep contactor tank or a packed tower. The ozone can also be introduced into the permeate J by a vacuum created by a venturi injector as the permeate J flows to the contactor 17. The contactor 17 is covered and the off-gas V in the headspace of the contactor 17 is collected and sent to an ozone destruction unit 18. Ozone concentrations in the contactor 17 can range from 2 to 40 mg/L and contact times can be from 1 minute to 15 minutes. Ozone can be generated using dry air or oxygen passed through a corona discharge system. On site oxygen generation systems, for example using pressure swing absorption, are preferred over stored liquid oxygen due to safety concerns. The low colloidal matter content of the permeate J reduces the ozone demand.

The descriptions of processes and apparatus above are to provide at least one example of an embodiment within each claim but not to limit or define any claim. However, multiple processes and apparatus have been described above and It is possible that a particular process or apparatus described above is not within a specific claim. Process parameters are given as examples of how a plant may be operated and are not meant to limit a claim unless explicitly recited in a claim. Other processes for treating low strength wastewater might operate at parameters within ranges that are 50% or 100% larger in both directions than the parameter ranges described above, or within a 50% or 100% variation from a single parameter described above. If one or more elements of plant 100 are used to treat other wastes or under other conditions, which might be for example to treat a stronger waste stream, then one or more process ranges described above might not be suitable and would be substituted with other appropriate parameters. Various sub sets of the unit processes described in relation to plant 100 can be used in other treatment plants. Various sub sets of unit processes in the treatment plants described above may also be combined in ways other than those described to produce different treatment plants. The description of one process or apparatus may be useful in understanding another process or apparatus. Words such as "may", "preferable" or "typical", or variations of them in the description above, indicate that a process step or apparatus element is possible, preferable or typical, according to the word used, but still optional and not necessarily part of any claimed invention unless explicitly included in a claim.

U.S. provisional patent applications 61/373,549 filed on Aug. 13, 2011; 61/439,068 filed on Feb. 3, 2012; and, 61/452, 956 filed on Mar. 15, 2012 are incorporated herein by this reference to them.

We claim:

1. A process for treating low strength wastewater comprising two or more of the steps of,
    a) treating the wastewater with a primary treatment to produce a primary effluent and a primary sludge, the primary treatment comprising i) contact aeration of the wastewater or the addition of a flocculant and/or a polymer to the wastewater prior to ii) passing the wastewater through a clarifier or micro-screen such that the primary sludge contains at least 50% of the BOD in the wastewater;
    b) treating primary sludge by anaerobic digestion wherein the anaerobic digestion is performed at a solids content of 4% dry solids or more produced or maintained by way of influent thickening or recuperative thickening; and,
    c) treating primary effluent by a secondary treatment, wherein the secondary treatment comprises i) nitritation and denitritation, ii) digestion by anammox bacteria, or iii) passing through a moving bed bioreactor at a hydraulic retention time of 90 minutes or less or at a loading rate of at least 6 kg BOD per cubic meter of tank per day.

2. The process of claim 1 comprising adding a co-digestion waste to the anaerobic digester at a rate of 30% or more of the total VS loading to the digester.

3. A process for treating low strength wastewater comprising the steps of,
    a) treating the wastewater with a primary treatment to produce a primary effluent and a primary sludge;
    b) treating the primary sludge by anaerobic digestion; and,
    c) treating the primary effluent by a secondary treatment,
    wherein
    A) the primary treatment comprising i) solids contact aeration of the wastewater or the addition of a coagulant and/or a flocculant to the wastewater prior to ii) passing the wastewater through a clarifier or micro-screen such that the primary sludge contains at least 50% of the BOD in the wastewater; or,
    B) the anaerobic digestion is performed at a solids content of 4% dry solids or more produced or maintained by way of influent thickening or recuperative thickening; or,
    C) the secondary treatment comprises i) nitritation and denitritation, ii) nitrogen removal by anammox bacteria, or iii) passing through a moving bed bioreactor at a hydraulic retention time of 90 minutes or less or at a loading rate of 6 kg BOD per cubic meter of tank per day or more,
    and further comprising adding a co-digestion waste to the anaerobic digester at a rate of 30% or more of the total VS loading to the digester.

4. The process of claim 3 wherein the feed stream comprises i) effluent from an anaerobic digester that has treated a portion of the wastewater or ii) a screened or clarified portion of the raw wastewater.

5. A process for treating a low strength wastewater comprising the steps of,
    a) treating the wastewater with a primary treatment to produce a primary effluent and a primary sludge;
    b) treating the primary effluent by a secondary treatment to produce an effluent and a secondary sludge;
    c) treating the primary sludge and a thickened portion of the secondary sludge in an anaerobic digester;
    d) maintaining a solids content of 4% dry solids in the anaerobic digester by way of recuperative thickening or the addition of a co-digestion waste; and,
    e) adding a co-digestion waste to the anaerobic digester at a rate of 30% or more of the total VS loading to the digester.

6. A process for treating a low strength wastewater comprising the steps of,
    a) treating the wastewater with a primary treatment to produce a primary effluent and a primary sludge;
    b) treating the primary effluent by a secondary treatment to produce an effluent and a secondary sludge;
    c) treating the primary sludge and a thickened portion of the secondary sludge in an anaerobic digester; and,
    d) adding a co-digestion waste to the anaerobic digester at a rate of 30% or more of the total VS loading to the digester,
    wherein the secondary treatment comprises the steps of,
    i) treating a feed stream in an anoxic tank;
    ii) treating effluent from the anoxic tank in a nitritation tank; and,
    iii) recirculating a portion of effluent from the nitritation tank to the anoxic tank.

7. A process for treating wastewater comprising,
 a) anaerobic digestion of an influent to produce a digestate;
 b) returning a thickened portion of the digestate to step a);
 c) treating a remaining portion of the digestate with a membrane filtration unit;
 d) returning a portion of the remaining portion retained by the membrane filtration unit to step a); and,
 e) adding a co-digestion waste to the anaerobic digester at a rate of 30% or more of the total VS loading to the digester.

8. The process of claim 7 wherein the membrane filtration unit is air scrubbed.

9. The process of claim 7 wherein the anaerobic digestion is performed at a solids content of 4% dry solids or more.

* * * * *